US008156151B2

(12) United States Patent
Sidman

(10) Patent No.: US 8,156,151 B2
(45) Date of Patent: Apr. 10, 2012

(54) APPARATUS, METHOD AND SYSTEM FOR TRACKING INFORMATION ACCESS

(75) Inventor: David Sidman, Brooklyn, NY (US)

(73) Assignee: Content Directions, Inc., New York, NY (US)

( * ) Notice: Subject to any disclaimer, the term of this patent is extended or adjusted under 35 U.S.C. 154(b) by 0 days.

(21) Appl. No.: 12/760,357

(22) Filed: Apr. 14, 2010

(65) Prior Publication Data

US 2010/0211552 A1   Aug. 19, 2010

Related U.S. Application Data

(63) Continuation of application No. 10/470,352, filed as application No. PCT/US02/02476 on Jan. 25, 2002, now abandoned.

(60) Provisional application No. 60/264,333, filed on Jan. 25, 2001, provisional application No. 60/268,766, filed on Feb. 14, 2001, provisional application No. 60/276,459, filed on Mar. 16, 2001, provisional application No. 60/279,792, filed on Mar. 29, 2001, provisional application No. 60/303,768, filed on Jul. 10, 2001, provisional application No. 60/328,270, filed on Oct. 9, 2001, provisional application No. 60/328,274, filed on Oct. 9, 2001, provisional application No. 60/270,473, filed on Feb. 21, 2001, provisional application No. 60/267,899, filed on Feb. 9, 2001, provisional application No. 60/267,875, filed on Feb. 8, 2001, provisional application No. 60/328,275, filed on Oct. 9, 2001.

(51) Int. Cl.
 *G06F 17/30* (2006.01)
(52) U.S. Cl. ........................................ 707/793; 707/803
(58) Field of Classification Search ........................ None
 See application file for complete search history.

(56) References Cited

U.S. PATENT DOCUMENTS 5,021,968 A   6/1991   Ferketic
5,288,981 A   2/1994   Davis
(Continued)

FOREIGN PATENT DOCUMENTS

EP   0715244 A1   6/1996
(Continued)

OTHER PUBLICATIONS

"Managing Intellectual Property Resources Using the DOI System", XML Europe 2001, Eamonn Neylon, Internationales Congress Centrum (ICC), May 2001.

(Continued)

*Primary Examiner* — Debbie Le
(74) *Attorney, Agent, or Firm* — Walter G. Hanchuk; Chadbourne and Parke LLP

(57) ABSTRACT

An apparatus, method and system to track information access over a communications network. The present disclosure teaches how to associate access credentials with content accesser in a global and persistent manner. Both content and people are registered with a Digital Object Identifier (DOI) handle system (1603). Furthermore, security and other information such as certificates, personal records, encryption keys, and all other objects involved in such transactions may also be registered with a DOI in the handle system and/or may be associated with another DOI as one of the multiple-resolution pointers contained in a DOI record. A right clearinghouse (1604) then maintains a rights database associated content rights with content accessers by DOIs. The association of people, i.e., content accessers, with digital object identifiers further ensures that content and accessers may be mapped in a manner allowing for the secure tracking of content access.

20 Claims, 12 Drawing Sheets

U.S. PATENT DOCUMENTS

| | | | |
|---|---|---|---|
| 5,334,824 | A | 8/1994 | Martinez |
| 5,347,791 | A | 9/1994 | Ginzl et al. |
| 5,592,408 | A | 1/1997 | Keskin et al. |
| 5,608,900 | A | 3/1997 | Dockter et al. |
| 5,629,981 | A | 5/1997 | Nerlikar |
| 5,694,604 | A | 12/1997 | Reiffin |
| 5,717,925 | A | 2/1998 | Harper et al. |
| 5,721,943 | A | 2/1998 | Johnson |
| 5,765,874 | A | 6/1998 | Chanenson et al. |
| 5,768,388 | A | 6/1998 | Goldwasser et al. |
| 5,774,552 | A | 6/1998 | Grimmer |
| 5,805,800 | A | 9/1998 | Kotani et al. |
| 5,832,508 | A | 11/1998 | Sherman et al. |
| 5,835,735 | A | 11/1998 | Mason et al. |
| 5,857,102 | A | 1/1999 | McChesney et al. |
| 5,884,271 | A | 3/1999 | Pitroda |
| 5,889,993 | A | 3/1999 | Kroeger et al. |
| 5,918,214 | A | 6/1999 | Perkowski |
| 5,930,363 | A | 7/1999 | Stanford et al. |
| 5,950,173 | A | 9/1999 | Perkowski |
| 5,974,453 | A | 10/1999 | Andersen et al. |
| 5,991,876 | A | 11/1999 | Johnson et al. |
| 5,999,095 | A | 12/1999 | Earl et al. |
| 6,006,242 | A | 12/1999 | Poole et al. |
| 6,014,628 | A | 1/2000 | Kovarik, Jr. |
| 6,045,048 | A | 4/2000 | Wilz, Sr. et al. |
| 6,061,708 | A | 5/2000 | McKeehan et al. |
| 6,068,127 | A | 5/2000 | Hunter |
| 6,073,140 | A | 6/2000 | Morgan et al. |
| 6,111,506 | A | 8/2000 | Yap et al. |
| 6,135,646 | A | 10/2000 | Kahn et al. |
| 6,138,225 | A | 10/2000 | Upton et al. |
| 6,151,624 | A | 11/2000 | Teare et al. |
| 6,154,738 | A | 11/2000 | Call |
| 6,154,777 | A | 11/2000 | Ebrahim |
| 6,185,307 | B1 | 2/2001 | Johnson, Jr. |
| 6,269,373 | B1 | 7/2001 | Apte et al. |
| 6,325,284 | B1 | 12/2001 | Walker et al. |
| 6,339,744 | B1 | 1/2002 | Hancock et al. |
| 6,343,361 | B1 | 1/2002 | Nendell et al. |
| 6,356,915 | B1 | 3/2002 | Chtchetkine et al. |
| 6,370,534 | B1 | 4/2002 | Odom et al. |
| 6,412,071 | B1 | 6/2002 | Hollander et al. |
| 6,512,837 | B1 | 1/2003 | Ahmed |
| 6,694,471 | B1 | 2/2004 | Sharp |
| 6,748,448 | B1 | 6/2004 | Barrera et al. |
| 6,760,746 | B1 | 7/2004 | Schneider |
| 6,760,767 | B1 | 7/2004 | Miesbauer et al. |
| 6,807,550 | B1 | 10/2004 | Li et al. |
| 6,885,748 | B1 | 4/2005 | Wang |
| 6,959,326 | B1 | 10/2005 | Day et al. |
| 6,996,538 | B2 * | 2/2006 | Lucas ............................ 705/28 |
| 7,031,964 | B1 | 4/2006 | King et al. |
| 7,188,136 | B1 * | 3/2007 | Aoshima et al. .............. 709/203 |
| 7,200,667 | B2 | 4/2007 | Teodosiu et al. |
| 2001/0009583 | A1 | 7/2001 | Murakami |
| 2002/0018476 | A1 | 2/2002 | Roy |
| 2002/0029279 | A1 * | 3/2002 | Campbell et al. ............. 709/229 |
| 2002/0052885 | A1 | 5/2002 | Levy |
| 2002/0188657 | A1 | 12/2002 | Traversat et al. |
| 2006/0269061 | A1 * | 11/2006 | Balasubramanian et al. 380/247 |

FOREIGN PATENT DOCUMENTS

| | | |
|---|---|---|
| EP | 0 862 318 A2 | 9/1998 |
| EP | 0 999 488 A2 | 5/2000 |
| WO | WO 97/43717 | 11/1997 |
| WO | WO 00/62189 A2 | 10/2000 |

OTHER PUBLICATIONS

"Pre-Scoping Proposal", http//library.caltech.edu/openurl/record_documents/PreScoping_Jan_3rd.htm, Jan. 3, 2002.

"Scoping Agreements I",http://library.caltech.edu/openurl/record_documents/Scoping_Jan8th.htm, Jan. 8, 2002.

"SFX", Ex Libris, http://www.exlibrisgroup.com/sfx.htm, 2005.

"First Steps in an Information Commerce Economy, Digital Rights Management in the Emerging EBook Environment", Eamonn Neylon, D-Lib Magazine, Jan. 2001, v. 7 No. 1.

"Intellectual Property in a Fragmented World", Eamonn Neylon, May 1998, http://www.infoloom.com/gcaconfs/WEB/paris98/neylon.htm.

"[handle-dev] New Handle Client-SDX", http://132.151.9.20/mail-archive/handle-dev/msg00036.html, May 17, 2001.

"Servlet DOI eXtension" download code from http://www.manifestsolutions.com/download.html, resolver.zip, Apr. 26, 2001 (Entire posted package); ReadME.txt, Apr. 26, 2001; radextraParse.java, Apr. 26, 2001; radresolver.java; Feb. 22, 2001; admin.gif, Feb. 22, 2001; thedemon.html, Feb. 22, 2001; message.txt, Jan. 11, 2001; arrow.gif, Dec. 6, 2000; handle.jar, Nov. 28, 2000; Jakarta-oro-2.0.1.jar, Nov. 23, 2000.

"Acknowledgements", http://1060research-server-1.co.uk/docs/1.0.0/docxter/doc_docs_acknowledgements.html, (2003-2004).

"NetKernel History", http://1060research-server-1.co.uk/docs/1.0.0/docxter/doc_intro_history.html, 2003-2004.

"The doi URI Scheme for Digital Object Identifier (DOI)", http://mirrors.isc.org/pub/www.watersprings.org/pub/id/draft-paskin-doi-uri-01.txt, Sep. 2002.

"Meeting Report of the NISO Linking Workshop", Mark Needleman, National Information Standards Organization, Feb. 11, 1999.

"First Workshop on Linkage From Citations to Electronic Journal Literature", National Information Standards Organization, Feb. 11, 1999.

"Second Workshop on Linkage From Citations to Electronic Journal Literature", National Information Standards Organization, Jun. 9, 1999.

"The DOI Metadata Initiative an Overview", David Sidman, May 11, 1998.

"A Progress Report From Workshop on the DOI Held in May 1998", The International DOI Foundation, Norman Paskin.

"The Digital Object Identifier System" Luxembourg DOI workshop DGXIII/DOI Foundation May 20, 1998, 63 sheets of slides.

Arms, W.Y. et al., "An Architecture for Information in Digital Libraries", D-Lib Magazine, Feb. 1997, pp. 1-12.

Hoffman, P. et al., "URN Resolution Overview", Oct. 21, 1995, pp. 1-4.

"In Search of the Unicorn: The Digital Object identifier from a User Perspective", BNBRF Report, No. 89, Feb. 1998, pp. 1-36.

Kahle, B., "Preserving The Internet", Scientific American, Mar. 1, 1997, pp. 72-73.

Kahle R. et al. "A Framework For Distributed Digital Object Services", Kahn/Wilensky Architecture, May 13, 1995, pp. 1-13.

Mojo Nation Docs: "Technology Overview", Mojo Nation, Feb. 14, 2000, pp. 1-5.

Payette, S. et al., "Interoperability for Digital Objects and Repositories", D-Lib Magazine, vol. 5, No. 5, May 1999, pp. 1-17.

Paskin, M., "Digital Object Identifier: implementing a standard digital identifier as they key to effective digital rights management", The International DOI Foundation, Apr. 2000, pp. 1-20.

Simonson, J. et al. "Content Permanence Via Versioning and Fingerprinting", Proceedings of the ACM Conference on Hypertext, May 30, 2000, pp. 226-227.

Simonson, J. et al., "Version augmented URIs for reference permanencevia an Apache module design", Computer networks and ISDN Systems, vol. 30, No. 1-7, Apr. 1998, pp. 337-345.

"The DOI Handbook Chapter 6: Resolution", from www.doi.org/handbook_2000; 17 Nov. 2000, pp. 1-4.

Tilley, S. et al., "Spreading Knowledge About Gnutella: A Case Study in Understanding Net-Centric Applications", IEEE, May 12, 2001, pp. 189-198.

Supplementary European Search Report for EP 02713463 dated Feb. 4, 2005, 3 pages.

Supplementary European Search Report for EP 02718881 dated Feb. 4, 2005, 3 pages.

Supplementary European Search Report for EP 02718882 dated Feb. 4, 2005, 3 pages.

Supplementary European Search Report for EP 02706002 dated Feb. 22, 2005, 3 pages.

Supplementary European Search Report for EP 02709190 dated Feb. 16, 2005, 3 pages.

Yasuyuki Murakami, "Secret Key Registration Method, Secret Key Register, Secret Key Issuing Method, Cryptographic Communication Method and Cryptographic Communication System", Jul. 26, 2001, U.S. Patent Application Publication No. US 2001/0009583.

"Syntax for the Digital Object Identifier", May 12, 2000, National Information Standards Organization, ANSI/NISO Z39.84-2000.

"An Architecture for Information in Digital Libraries", Arms et al., D-Lib Magazine, Feb. 1997.

Davidson et al., "Digital Object Identifiers and their Role in the Implementation of Electronic Publishing", 1998.

"A Framework for Distributed Digital Object Services," Robert Kahn & Robert Wilensky, May 13, 1995, Kahn/Wilensky Architecture. (Provided by Applicant's IDS).

"Interoperability for Digital Objects and Repositories", Payette et al., D-Lib Magazine, May 1999.

Paskin, Norman. "DOI: Current Status and Outlook", The International DOI Foundation, May 1999.

Paskin, Norman. "The DOI Handbook", Version 0.5.1, International DOI Foundation, Sep. 2000.

"A Reference Model for Metadata", Bretherton et al., University of Wisconsin, Mar. 1994, pp. 1-18.

* cited by examiner

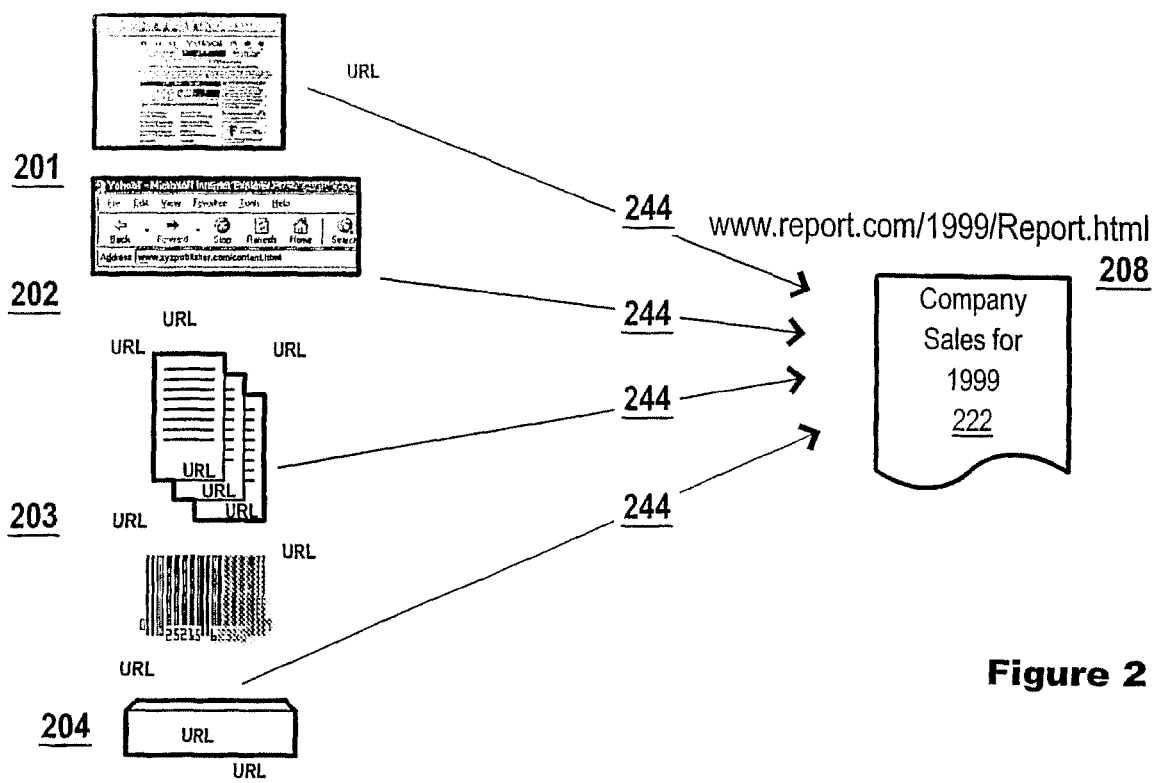
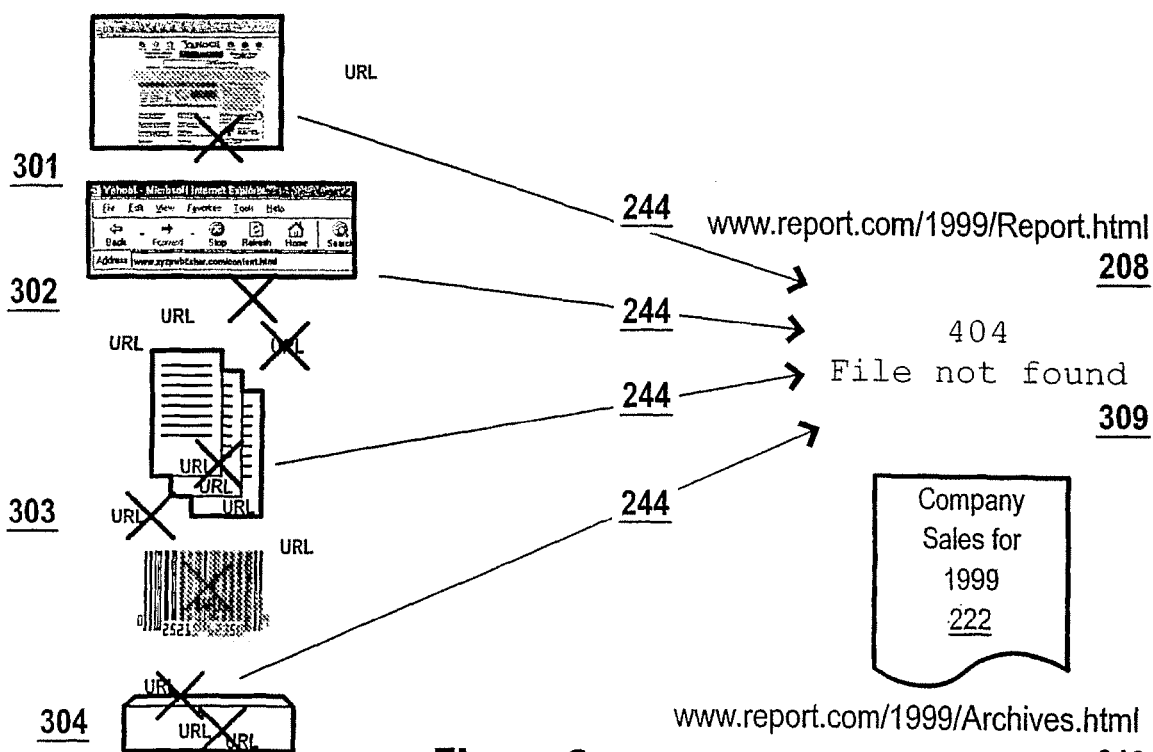

Personal DOI Registration Process

APPARATUS, METHOD AND SYSTEM FOR TRACKING INFORMATION ACCESS

RELATED APPLICATIONS

The instant application is a continuation of and claims priority to U.S. patent application Ser. No. 10/470,352 for "Apparatus, Method and System for Tracking Information Access" filed on Jul. 24, 2003, which in turn claims priority to the following U.S. provisional patent applications: (1) Ser. No. 60/264,333 for "Reference Linking with DOIs" filed on Jan. 25, 2001; (2) Ser. No. 60/268,766 for "Apparatus, Method, and System for Multiple Resolution Affecting Information Access" filed on Feb. 14, 2001; (3) Ser. No. 60/276,459 for "Apparatus, Method, and System for Registration Effecting Information Access" filed on Mar. 16, 2001; (4)Ser. No. 60/279,792 for "Apparatus, Method and System For Directory Quality Assurance" filed on Mar. 29, 2001; (5) Ser. No. 60/303,768 for "Apparatus, Method, and System for Accessing Digital Rights Management Information" filed on Jul. 10, 2001; (6) Ser. No. 60/328,275 for "Apparatus, Method and System For Accessing Digital Rights Management Information" filed on Oct. 9, 2001; (7) Ser. No. 60/267,875 for "Apparatus, Method, and System for Accessing Information" filed on Feb. 8, 2001; (8) Ser. No. 60/267,899 for "Provisional filing for Apparatus, Method, and System for Accessing Information" filed on Feb. 9, 2001; (9) Ser. No. 60/270,473 for "Business Value and Implementation Considerations For The DOI" filed on Feb. 21, 2001; (10) Ser. No. 60/328,274 for "Apparatus, Method And System For Effecting Information Access In A Peer Environment" filed on Oct. 9, 2001; (11) Ser. No. 60/328,270 for "Apparatus, Method and System For Tracking Information Access" filed on Oct. 9, 2001; each of these applications being herein incorporated by reference.

The instant application, also, hereby incorporates by reference the following Patent Cooperation Treaty applications: (12) for an "Apparatus, Method and System For Multiple Resolution Affecting Information Access," which was filed on Jan. 25, 2002 in the name of David Sidman; (13) for an "Apparatus, Method and System For Registration Effecting Information Access," which was filed on Jan. 25, 2002 in the name of David Sidman; (14) for an "Apparatus, Method and System For Directory Quality Assurance," which was filed on Jan. 25, 2002 in the name of David Sidman; (15) Apparatus, Method and System For Accessing Digital Rights Management Information," which was filed on Jan. 25, 2002 in the name of David Sidman; (16) for an "Apparatus, Method and System For Effecting Information Access in a Peer Environment," which was filed on Jan. 25, 2002 in the name of David Sidman.

FIELD

The present invention relates generally to an apparatus, method and system to track information access across a communications network. More particularly, the disclosed invention relates to an apparatus, method and system to facilitate the association of people, content, and digital rights to streamline the tracking of users accessing information.

BACKGROUND

Internet

As Internet usage increases, the amount of information available on the Internet also increases. The information that exists on the Internet is of many different types, including documents in many formats such as: computer software, databases, discussion lists, electronic journals, library catalogues, online information services, mailing lists, news groups, streaming media, and the like. Fortunately, much of the information on the Internet can be accessed through the World-Wide Web using a web browser to interact with the network in a user-friendly way.

Networks

Networks are commonly thought to consist of the interconnection and interoperation of clients, peers, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations.

Transmission Control Protocol-Internet Protocol (TCP/IP)

The proliferation and expansion of computer systems, databases, and networks of computers has been facilitated by an interconnection of such systems and networks in an extra-territorial communications network commonly referred to as the Internet. The Internet has developed and largely employs the Transmission Control Protocol-Internet Protocol (TCP/IP). TCP/IP was developed by a Department of Defense (DoD) research project to interconnect networks made by various and varying network vendors as a foundation for a network of networks, i.e., the Internet. The development of TCP/IP was in part driven by a requirement by the DoD to have a network that will continue to operate even if damaged during battle, thus allowing for information to be routed around damaged portions of the communications network to destination addresses. Of course, if the source or destination address location itself is rendered inoperable, such delivery will not be possible.

The Internet is a packet-switched network and thus, information on the Internet is broken up into pieces, called packets, and transmitted in packet form. The packets contain IP addressing information called headers, which are used by routers to facilitate the delivery of the packets from a source to a destination across intermediary nodes on the Internet. Upon arrival at the destination, the packets are reassembled to form the original message, and any missing packets are requested again.

The IP component of the protocol is responsible for routing packets of information based on a four byte addressing mechanism; the address is written as four numbers separated by dots, each number ranging from 0 to 255, e.g., "123.255.0.123". IP addresses are assigned by Internet authorities and registration agencies, and are unique.

The TCP portion of the protocol is used for verifying that packets of information are correctly received by the destination computer from the source, and if not, to retransmit corrupt packets. Other transmission control protocols are also commonly used that do not guarantee delivery, such as User Datagram Protocol (UDP).

World Wide Web

The proliferation and expansion of the Internet, and particularly the World Wide Web (the web), have resulted in a vast and diverse collection of information. Various user interfaces that facilitate the interaction of users with information technology systems (i.e., people using computers) are currently in use. An information navigation interface called WorldWideWeb.app (the web) was developed in late 1990.

Subsequently, information navigation interfaces such as web browsers have become widely available on almost every computer operating system platform.

Generally, the web is the manifestation and result of a synergetic interoperation between user interfaces (e.g., web browsers), servers, distributed information, protocols, and specifications. Web browsers were designed to facilitate navigation and access to information, while information servers were designed to facilitate provision of information. Typically, web browsers and information servers are disposed in communication with one another through a communications network. Information Servers function to serve information to users that typically access the information by way of web browsers. As such, information servers typically provide information to users employing web browsers for navigating and accessing information on the web. Microsoft's Internet Explorer and Netscape Navigator are examples of web browsers. In addition, navigation user interface devices such as WebTV have also been implemented to facilitate web navigation. Microsoft's Information Server and Apache are examples of information servers.

Universal Resource Locator (URL)

The expansion of the web has resulted in an enormous quantity of information, which is accessible through the use of Universal Resource Locators (URLs). An URL is an address that is typically embodied as a hyperlink in a web page or is typed into a web browser. URLs for a given resource (most commonly a file located on a remote computer) refer only to a location for that resource. Typically, the reference to the location is achieved through the use of an unresolved IP address in conjunction with a directory path and file name; e.g., "http://www.aWebSite.com/aFolder/aFile.html". In this example, the URL directs the browser to connect to the computer named "www" in the domain "aWebSite.com," and to request the file named "aFile.html" stored in directory "aFolder" at that computer.

Universal Name Identifier (UNI)

The Corporation for National Research Initiatives has created and implemented a new means of naming and locating information, called the Handle System. The Handle System is designed to improve upon the current use of URLs.

The Handle System introduces a level of indirection to locating and distributing information over the Internet. The Handle System is a general-purpose system for naming resources. Instead of being assigned a URL based on a particular resource's current network location, a resource may be assigned a Universal Name Identifier. A UNI is a form of Universal Resource Identifier (URI). URIs include both UNIs and URLs. A UNI, unlike a URL, serves and shall be regarded henceforth as a name for the resource that is persistent regardless of changes in the resource's location or other attributes. In turn, a Universal Resource Name (URN) is a type of UNI (i.e., a UNI subsumes the concept of a URN). Furthermore, a Handle is a type of URN. And a Digital Object Identifier (DOI) is a type of Handle. Thus, various forms of UNIs include Handles, URNs, DOIs, and/or the like. The various terms and/or forms of UNIs will be used interchangeably throughout this document, and may be assumed to be interchangeable unless stated otherwise. A Handle is a unique name, which is registered with the Handle System along with the current network location of the named resource. This location information commonly takes the form of a URL. One common type of Handle is known as a Digital Object Identifier (DOI). Handles may be then distributed to users in lieu of a URL, and superficially appear to function similarly to a hyperlink. When a user encounters a Handle, the user may select or enter the Handle much like a URL hyperlink, so long as the user's web browser is capable of making Handle requests. Such an encounter triggers an automated process to look up a resource's current location. The current location of the resource is associated with the resource's Handle in a directory made available by the Handle System, which in turn directs the user to the resource's current location. Unlike with a URL, if the resource moves, the Handle System directory entry can be updated, thereby assuring a persistent association between a Handle and the resource it identifies. An analogy can be made to the physical world: knowing only a URL for a given resource is akin to knowing only a person's street address, and not her name. If she were to move across town, it would be very difficult to locate her without knowing her name. The Handle System allows resources to be permanently named by way of a Handle, and it allows the current network location of resources to be looked up based on that name in a Handle System directory.

Digital Rights Management (DRM)

Digital Rights Management (DRM) involves the description, layering, analysis, valuation, trading, and monitoring of an owner's property rights to an asset. DRM covers the management of the digital rights to the physical manifestation of a work (e.g., a textbook) or the digital manifestation of a work (e.g., a web page). DRM also covers the management of an asset whether the asset has a tangible or an intangible value. Current DRM systems include languages for describing the terms and conditions for use of an asset, tracking asset usage by enforcing controlled environments or encoded asset manifestations, and closed architectures for the overall management of the digital rights. Current DRM systems rely upon location-based identifiers such as the URL.

SUMMARY

Digital Object Identifiers (DOIs) overcome many of the shortcomings of IP addresses and other location-based addressing schemes. DOIs enable access to information over a communications network by providing a persistent identifier for information that may be regularly relocated. DOIs overcome the limitations of network addressing schemes limited to addressing locations by providing a mechanism to associate identifiers with information through an added level of indirection instead of associating identifiers with locations Although DOIs provide a mechanism that allows for the association of an identifier with information instead of a location, DOIs in and of themselves do not provide for the access of multiple and/or varying instances of a piece of information in various locations, formats, or the access and/or tracking of various services associated with a given piece of information, based on various contexts of use.

In one embodiment of the present invention, a method is taught for using at least one computer to effect access to information. The method comprises: collecting information regarding an entity (entity information); generating an unique, persistent, and universal name identifier (UPUNI); storing the collected entity information in a database record in a database; generating validation information; transmitting validation information to access devices of the entity, which is represented by the entity information, (EREI; i.e. Entity Represented by Entity Information); transmitting validation information to the UPUNI registration agency; storing the generated validation information in a database record in a database; and registering a resolvable association between an UPUNI and reference to related information.

In another embodiment of the present invention, a method is taught for using at least one computer to effect access to information. The method comprises: determining if information an entity desires to access (desired information) on the entity's access device (entity device) has an unique, persistent, and universal name identifier (UPUNI) embedded within the desired information; determining if the desired information is inaccessible; determining if there exists an UPUNI that represents the entity (E-UPUNI); generating the E-UPUNI, if the entity is un-represented by an UPUNI; resolving the entity device to the desired information's UPUNI (DI-UPUNI); providing entity verification information; verifying the entity's identity and access rights to the desired content with the provided entity verification information (entity verification); and providing access credentials, if the entity's identity and access rights to the desired content are verified.

In another embodiment of the present invention, a memory storing a data structure is taught. The data structure has associated data types, including: a data type to store an unique, persistent, and universal name identifier (UPUNI) associated with information an entity desires (desired information) to access (DI-UPUNI); and a data type to store an UPUNI associated with an entity (E-UPUNI).

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the disclosure.

FIGS. 2 and 3 illustrate URL addressing across a communications network with moving information;

DETAILED DESCRIPTION

Digital Object Identifier Access Tracker Controller

Figure 1:
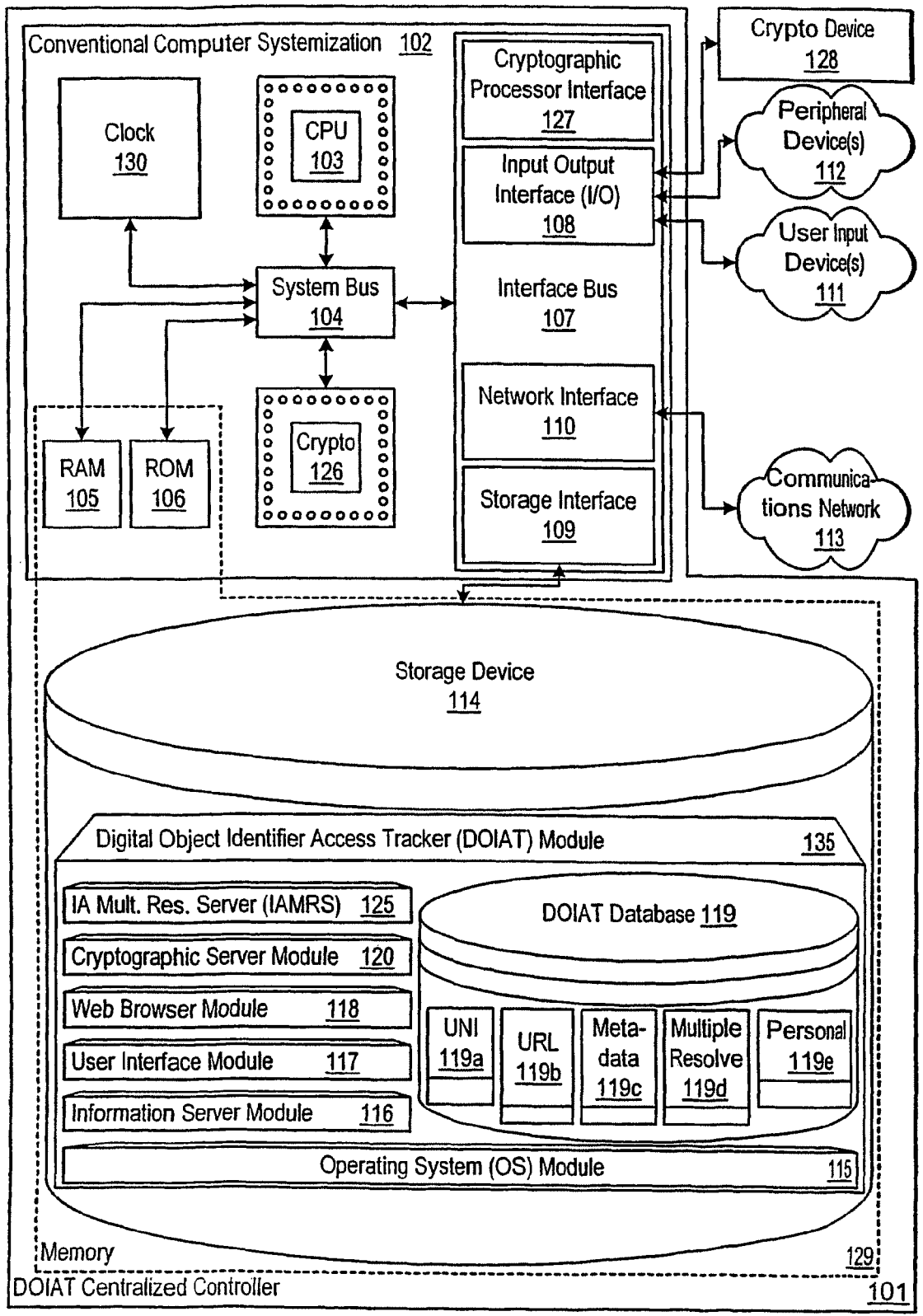
FIG. 1 illustrates one example embodiment incorporated into a DOI Access Tracker (DOIAT) controller.

FIG. 1 illustrates one non-limiting example embodiment incorporated into a Digital Object Identifier Access Tracker (DOIAT) controller 101. In this embodiment, the DOIAT controller 101 may serve to register, resolve, process, store, update, and validate Handles and any associated information, and/or the like.

In one embodiment, the DOIAT controller 101 may be connected to and/or communicate with entities such as, but not limited to: one or more users from user input devices 111; peripheral devices 112; and/or a communications network 113. The DOIAT controller may even be connected to and/or communicate with a cryptographic processor device 128.

A typical DOIAT controller 101 may be based on common computer systems that may comprise, but are not limited to, components such as: a computer systemization 102 connected to memory 129.

Computer Systemization

A computer systemization 102 may comprise a clock 130, central processing unit (CPU) 103, a read only memory (ROM), a random access memory (RAM), and/or an interface bus 107, and conventionally, although not necessarily, are all interconnected and/or communicating through a system bus 104. The system clock typically has a crystal oscillator and provides a base signal. The clock is typically coupled to the system bus and various means that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Optionally, a cryptographic processor 126 may similarly be connected to the system bus. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as the Intel Pentium Processor and/or the like. The CPU interacts with memory through signal passing through conductive conduits to execute stored program code according to conventional data processing techniques. Such signal passing facilitates communication within the DOIAT controller and beyond through various interfaces.

Interface Adapters

Interface bus(ses) 107 may accept, connect, and/or communicate to a number of interface adapters, conventionally although not necessarily in the form of adapter cards, such as but not limited to: input output interfaces (I/O) 108, storage interfaces 109, network interfaces 110, and/or the like. Optionally, cryptographic processor interfaces 127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (PCI), Personal Computer Memory Card International Association (PCMCIA), and/or the like.

Storage interfaces 109 may accept, communicate, and/or connect to a number of storage devices such as, but not limited to: storage devices 114, removable disc devices, and/or the like. Storage interfaces may employ connection protocols such as, but not limited to: (Ultra) Advanced Technology Attachment (Packet Interface) ((Ultra) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 110 may accept, communicate, and/or connect to a communications network 113. Network interfaces may employ connection protocols such as, but not limited to: direct connect, Ethernet (thick, thin, twisted pair 10/100/1000 Base T, and/or the like), Token Ring, wireless connection such as IEEE 802.11b, and/or the like. A communications network may be any one and/or the combination of the following: a direct interconnection; the Internet; a Local Area Network (LAN); Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface.

Input Output interfaces (I/O) 108 may accept, communicate, and/or connect to user input devices 111, peripheral devices 112, cryptographic processor devices 128, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394; infrared; joystick; keyboard; midi; optical; PC AT; PS/2; parallel; radio; serial; USB; video interface: BNC, composite, digital, RCA, S-Video, VGA, and/or the like; wireless; and/or the like. A common output device is a video display, which typically comprises a CRT or LCD based monitor with an interface (e.g., VGA circuitry and cable) that accepts signals from a video interface. The video interface composites information generated by a computer systemization and generates video signals based on the composited information. Typically, the video interface provides the composited video information through a video connection interface that accepts a video display interface (e.g., a VGA connector accepting a VGA display cable).

User input devices 111 may be card readers, dongles, finger print readers, gloves, graphics pads, joysticks, keyboards, mouse (mice), trackballs, trackpads, retina readers, and/or the like.

Peripheral devices 112 may be connected and/or communicate with or to I/O and/or with or to other facilities of the like such as network interfaces, storage interfaces, and/or the like). Peripheral devices may be cameras, dongles (for copy protection, ensuring secure transactions as a digital signature, and/or the like), external processors (for added functionality), goggles, microphones, monitors, network interfaces, printers, scanners, storage devices, visors, and/or the like.

Cryptographic units such as, but not limited to, microcontrollers, processors 126, interfaces 127, and/or devices 128 may be attached, and/or communicate with the DOIAT controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 284.

Memory

A storage device 114 may be any conventional computer system storage. Storage devices may be a fixed hard disk drive, and/or other devices of the like. However, it is to be understood that a DOIAT controller and/or a computer systemization may employ various forms of memory 129. For example, a computer systemization may be configured wherein the functionality of on-chip CPU memory (e.g., registers), RAM, ROM, and any other storage devices are provided by a paper punch tape or paper punch card mechanism; of course such an embodiment is not preferred and would result in an extremely slow rate of operation. In a typical configuration, memory 129 will include ROM, RAM, and a storage device 114. Generally, any mechanization and/or embodiment allowing a processor to affect the storage and/or retrieval of information is regarded as memory 129. Thus, a computer systemization generally requires and makes use of memory. However, memory is a fungible technology and resource, thus, any number of memory embodiments may be employed in lieu of or in concert with one another.

Module Collection

The storage devices 114 may contain a collection of program and/or database modules and/or data such as, but not limited to: an operating system module 115 (operating system); an information server module 116 (information server); a user interface module 117 (user interface); a web browser module 118 (web browser); databases 119; a cryptographic server module 120 (cryptographic server); DOI Access Tracker (DOIAT) module 125; and/or the like (i.e., collectively a module collection). These modules may be stored and accessed from the storage devices and/or from storage devices accessible through an interface bus. Although non-conventional software modules such as those in the module collection, typically and preferably, are stored in a local storage device 114, they may also be loaded and/or stored in memory such as: peripheral devices, RAM, remote storage facilities through a communications network, ROM, various forms of memory, and/or the like.

Operating System

The operating system module 115 is executable program code facilitating the operation of a DOIAT controller. Typically, the operating system facilitates access of I/O, network interfaces, peripheral devices, storage devices, and/or the like. The operating system preferably is a conventional product such as Apple Macintosh OS X Server, AT&T Plan 9, Microsoft Windows NT Server, Unix, and/or the like operating systems. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the DOIAT controller to communicate with other entities through a communications network 113. Various communication protocols may be used by the DOIAT controller as a subcarrier transport mechanism for interacting with the Handle System, such as, but not limited to: multicast, TCP/IP, UDP, unicast, and/or the like.

Information Server

An information server module 116 is stored program code that is executed by the CPU. The information server may be a conventional Internet information server such as, but not limited to, Microsoft's Internet Information Server and/or the Apache Software Foundation's Apache. Preferably, the information server allows for the execution of program modules through facilities such as C++, Java, JavaScript, ActiveX, Common Gateway Interface (CGI) scripts, Active Server Page (ASP), and/or the like. Preferably the information server supports secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. Conventionally, an information server provides results in the form of web pages to web browsers, and allows for the manipulated generation of the web pages through interaction with other program modules. After a DNS resolution portion of an HTTP request is resolved to a particular information server, the information server resolves requests for information at specified locations on a DOIAT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." An information server may communicate to and/or with other modules in a module collection, including itself, and/or facilities of the like. Most frequently, the information server communicates with operating systems, other program modules, user interfaces, web browsers, and/or the like. An information server may contain, communicate, generate, obtain, and/or provide program module, system, user, and/or data communications, requests, and/or responses.

User Interface

A user interface module 117 is stored program code that is executed by the CPU. Preferably, the user interface is a conventional graphic user interface as provided by, with, and/or atop operating systems and/or operating environments such as Apple Macintosh OS, e.g., Aqua, Microsoft Windows (NT), Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A web browser module 118 is stored program code that is executed by the CPU. Preferably, the web browser is a conventional hypertext viewing application such as Microsoft Internet Explorer or Netscape Navigator (preferably with 128 bit encryption by way of HTTPS, SSL, and/or the like). Some web browsers allow for the execution of program modules through facilities such as Java, JavaScript, ActiveX, and/or the like. In one embodiment, web browsers are handle-enabled by way of a browser plug-in software such as the Handle System plug-in available from www.cnri.org. In an alternative embodiment handle support is integrated into the web browser. Web browsers and like information access tools may be integrated into PDAs, cellular telephones, and/or other mobile devices. A web browser may communicate to and/or with other modules in a module collection, including itself, and/or facilities of the like. Most frequently, the web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a web browser and information server, a combined application may be developed to perform similar functions of both. The combined application would similarly affect the obtaining and the provision of information to users, user agents, and/or the like from DOIAT enabled nodes. The combined application may be nugatory on systems employing standard web browsers. Such a combined module could be configured to communicate directly with the DOIAT without an intermediary information server to further enhance security.

DOIAT Database

A DOIAT database module 119 may be embodied in a database that is stored program code that is executed by the CPU and its stored data; the stored program code portion configuring the CPU to process the stored data. Preferably, the database is a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DOIAT database may be implemented using various standard data-structures, such as an array, hash, (linked) list, struct, table, and/or the like. Such data-structures may be stored in memory and/or in (structured) files. If the DOIAT database is implemented as a data-structure, the use of the DOIAT database may be integrated into another module such as the DOIAT module. Databases may be consolidated and/or distributed in countless variations through standard data processing techniques. Portions of databases, e.g., tables, may be exported and/or imported and thus decentralized and/or integrated. In one non-limiting example embodiment, the database module 119 includes tables such as but not limited to a UNI (e.g., Handle, DOI and/or other UNIs) table 119a, URL table 119b, metadata table 119c, multiple resolution table 119d, a personal (DOI information) table 119e, and/or the like. All the tables may be related by (enhanced) DOI key field entries as they are unique. In an alternative embodiment, these tables have been decentralized into their own databases and their respective database controllers (i.e., individual database controllers for each of the above tables). Of course, employing standard data processing techniques, one may further distribute the databases over several computer systemizations and/or storage devices. Similarly, configurations of the decentralized database controllers may be varied by consolidating and/or distributing the various database modules 119a-e. The DOIAT may be configured to keep track of user requests and various transactions tracking via database controllers.

A DOIAT database may communicate to and/or with other modules in a module collection, including itself, and/or facilities of the like. Most frequently, the DOIAT database communicates with a DOIAT module, other program modules, and/or the like. The database may contain, retain, and provide information regarding other nodes and data.

Cryptographic Server

A cryptographic server module 120 is stored program code that is executed by the CPU 103, cryptographic processor 126, cryptographic processor interface 127, cryptographic processor device 128, and/or the like. Preferably, cryptographic processor interfaces will allow for expedition of encryption and/or decryption requests by the cryptographic module; however, the cryptographic module, alternatively, may run on a conventional CPU. Preferably, the cryptographic module allows for the encryption and/or decryption of provided data. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. A cryptographic module may communicate to and/or with other modules in a module collection, including itself, and/or facilities of the like. Preferably, the cryptographic module supports encryption schemes allowing for the secure transmission of information across a communications network to enable a DOIAT module to engage in secure transactions if so desired by users. The cryptographic module facilitates the secure accessing of resources on DOIAT and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

Information Access Multiple Resolution Server (IAMRS)

An IAMRS module 125 is stored program code that is executed by the CPU. Generally, the DOIAT affects accessing, obtaining and the provision of information, and/or the like between nodes on a communications network. The IAMRS has the ability to resolve UNIs to multiple instantiations. Generally, the IAMRS acts as a lookup facility to create, maintain, and update associations between a given piece of information, its DOI, and its current locations. The IAMRS coordinates with the DOIAT database to identify nodes that may be useful for improving data transfer for requested information, for resolving to various formats of the requesting information, providing an enhanced mechanism to create queries regarding the information, and/or the like. An IAMRS enabling access of information between nodes may be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the IAMRS server employs a cryptographic server to encrypt and decrypt communications. The IAMRS may service requests, update association information for UNIs, and much more. A DOIAT module may communicate to and/or with other modules in a module collection, including itself, and/or facilities of the like. Most frequently, the IAMRS module communicates with a DOIAT database, operating systems, other program modules, and/or the like. The IAMRS may contain, communicate, generate, obtain, and/or provide program module, system, user, and/or data communications, requests, and/or responses.

DOI Access Tracker (DOIAT)

A DOIAT module 135 is stored program code that is executed by the CPU. Generally, the DOIAT registers personal DOIs (FIGS. 14 and 15), tracks/enables access to content (FIGS. 16 and 17), and obtains and provides information between nodes on a communications network, and/or the like. The DOIAT is a DOI enabled client and/or server that enables access, tracking, and verifying users, use, and content across a communications network based on DOIs. In one non-limiting example embodiment, the DOIAT may include a rights database 119e that is keyed to DOIs 119a. This database and/or data-structure maintains associations between users, digital rights, and content. The DOIAT may add the ability to validate content via an IARS. Alternatively, the DOIAT may operate in a stand alone mode separate from the IARS. In either embodiment, the DOIAT may be used to embed DOI values into content referenced by the DOI so that the content may be validated. The DOIAT coordinates with the DOIAT database to track and/or limit access to content accessed by users. A DOIAT enabling access of information between nodes maybe be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the DOIAT employs a cryptographic server to encrypt and decrypt communications. The DOIAT may catalog content, service requests, redirect requests, and much more. A DOIAT module may communicate to and/or with other modules in a module collection, including itself, and/or facilities of the like. Most frequently, the DOIAT module communicates internally and with other peers across a communications network with: a DOIAT database, an IAMRS module, operating systems, other program modules, and/or the like. The DOIAT may contain, communicate, generate, obtain, and/or provide program module, system, user, and/or data communications, requests, and/or responses.

Distributed DOIAT

The functionality of any of the DOIAT node controller components and/or functionalities may be combined, consolidated, and/or distributed in any number of ways to facilitate development and/or deployment. Similarly, the module collection may be combined in any number of ways to facilitate deployment and/or development. To accomplish this, one must simply integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load balancing data processing techniques. Furthermore, single instances may also be distributed across multiple controllers and/or storage devices; e.g., databases.

All program module instances and controllers working in concert may do so through standard data processing communication techniques.

The preferred DOIAT controller configuration will depend on the context of system deployment. Factors such as, but not limited to, the capacity and/or location of the underlying hardware resources may affect deployment requirements and configuration. Regardless of if the configuration results in more consolidated and/or integrated program modules, results in a more distributed series of program modules, and/or results in some combination between a consolidated and/or distributed configuration, communication of data may be communicated, obtained, and/or provided. Instances of modules (from the module collection) consolidated into a common code base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: Application Program Interfaces (API) information passage; (distributed) Component Object Model ((D)COM), (Distributed) Object Linking And Embedding ((D)OLE), and/or the like), Common Object Request Broker Architecture (CORBA), process pipes, shared files, and/or the like (inter-application communication). Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the preferable embodiment will depend upon the context of system deployment.

Finally, it is to be understood that the logical and/or topological structure of any combination of the module collection and/or the present invention as described in the figures and throughout are not limited to a fixed execution order and/or arrangement, but rather, any disclosed order is exemplary and all functional equivalents, regardless of order, are contemplated by the disclosure. Furthermore, it is to be understood that such structures are not limited to serial execution, but rather, any number of threads, processes, services, servers, and/or the like that may execute asynchronously, simultaneously, synchronously, and/or the like are contemplated by the disclosure.

IP Addressing

Users access communications networks through addresses. Addresses represent locations. Users traverse locations in a communications network hoping to find information. A common communications addressing scheme employs the IP address. The IP address may be likened to the real world by analogy to a street address. The IP address itself is a sequence of numbers, e.g., 209.54.94.99, and commonly has an associated name, e.g., www.contentdirections.com. A distributed database registry maintains the associated pairs of names and IP addresses and serves to resolve associated names into corresponding IP addresses. This allows people to remember and use names, e.g., www.report.com, instead of being forced to memorize and use a series of numbers, e.g., 209.54.94.99. These distributed databases assisting in the name resolution of IP addresses are commonly referred to as Domain Name Servers (DNS).

It is common for IP addresses to be embodied as Universal Resource Locators (URLs) that append even more navigation information into an address. Users may employ software to access information stored at URLs through the use of HTTP. An example is when a user specifies "http://www.report.com/reports/1999/IncomeStatement.html" in a web browser. Typically this further navigation information, i.e., "/reports/1999/IncomeStatement.html," provides a specific storage location within a computer server. This further navigation location may be likened to a real world address more specific than a street address that includes information such as a company name, department, and room number. This further navigation location is typically not Handled or resolved by DNSs, but instead by an information server at the resolved IP address. For example, an information server at the resolved address of 123.123.123.123 for www.report.com would interpret and return information at a local location of "/reports/1999/IncomeStatement.html" within the server. An Information Server is a means for facilitating communications between a communication network and the computer server at a particular IP address. Commercial examples of an Information Server include Apache. An Information Server may be likened to a mail department for a business that further routes correspondence to appropriate locations within the business.

FIGS. 2 and 3 illustrate that IP addressing mechanisms do not maintain an association with information as it moves across a communications networks. Web page links generally employ HTTP, which in turn relies on IP addressing. Thus, URL links simply point to a location on a communication network and are not necessarily associated with any specific information. For example, a URL link referencing www.news.com will have different information associated between the URL and the information made available at the www.news.com location as information at the location is updated daily. In many instances, locations themselves may disappear as companies move information, move their operations, go out of business, etc.

For example, a report entitled "Company Sales for 1999" 222 existing at a location www.report.com/1999/Report.html 208 may be moved to www.report-archives.com/1999/Oldreport.html 310, e.g., because the information was sold from one entity to another, archived, or for many other reasons. The report at www.report.com/1999/Report.html 208 may have had 5 million web pages and URL links referencing the location 244, and when users attempt to access the information they may well receive a "404 File not found" error 309 because that location no longer exists and/or no longer contains the desired information. The error results because the DNSs were designed to always resolve users' requests to a location and because DNSs are not designed to maintain an association between URLs and a specific instantiation of information.

FIG. 2 depicts a web page 201, a user entered address 202, a document 203, and a memory device 204 all employing URLs and consequently IP addressing in an attempt to reference a piece of information (the report "Company Sales for 1999") 222. Then in FIG. 2, the information 222 is moved from its original location 208 (for example at www.report.com/1999/Report.html) to a new location 310 of FIG. 2 (for example www.report.com/1999/Archives.html). In FIG. 3, this results in breaking 301-304 all the URLs 244 referencing the location and produces the dreaded "404 file not found" error 309 for all users and URLs making reference to the location (www.report.com/1999/Report.html) 208.

Handle System

Once a piece of information has been assigned a DOI and has been made available, the DOI system needs to be able to resolve what the user of the DOI wants to access. The technology that is used to manage the resolution of DOIs is better known as the "Handle System," and will be described in more detail below. THE DOI HANDBOOK provides a general overview of basic DOIs. In a nutshell, the Handle System includes an open set of protocols, a namespace, and an implementation of the protocols. The protocols enable a distributed computer system to store Handles (such as DOIs) of digital content and resolve those Handles into the information necessary to locate and access the content, to locate and access information related to the content, or to locate and access (i.e., provide an interface to) services associated with the content. This associated information can be changed as needed to reflect the current state of the identified content without changing the DOI, thus allowing the name of the item to persist over changes of location and other state information. Combined with a centrally administered DOI registration agency, the Handle System provides a general-purpose, distributed global naming service for the reliable management of information and services on networks over long periods of time. It is important to note that throughout the present disclosure that "source," "content" and/or "information" made accessible through the DOI system may comprise any identifiable content, source, information, services, transactions, and work of authorship, including articles, books, intangible objects, music albums, people, tangible physical objects, and/or the like further including selected discrete portions and/or combinations thereof. The accessible information may be a URL to an application that initiates a service, a transaction, provides a selection mechanism, and/or the like. In one non-limiting example, the DOI may even be associated with information identifying a human being such as a social security number, telephone number, and/or the like. In another non-limiting example, the DOI may be associated with software modules, programming "objects," or any other network-based resource. Furthermore, a DOI can be used to represent most anything including the online representation of physical products (e.g., items currently identified by UPC or bar codes). In such an example, DOIs could resolve to the manufacturer's catalog page describing or offering the product, or even, in a multiple-resolution scenario, offer all services related to the object such as where to go to get the item repaired; where to find replacement parts; what the new or replacement product is; what kinds of pricing or leasing options are available, etc. Other example embodiments implementing DOIs include: representing different modules of software that may operate in distributed fashion across a communications network; telephone numbers for Voice-over-IP technology; gene sequences; medical records and/or other permanent records (DOIs will be especially useful with permanent records protected via encryption and/or other method that might invoke a certificate or decryption key); and/or the like. Another example embodiment for a DOI is to represent the permanent location of a temporary and/or dynamic value such as, but not limited to a current stock quote; current bid and offer prices (for stocks and/or any other kind of auction and/or exchange); a company's current annual report (versus different DOIs for different prior-year annual reports); and/or the like.

Users may access information through Digital Object Identifiers (DOIs). DOIs are associated with (i.e., are names for) information itself. DOIs are instances of "Handles" and operate within the framework of the "Handle system." A DOI allows for access to persistently associated information. The DOI is a string of characters followed by a separator further followed by a string of characters, e.g., 10.1065/abc123def. It should be noted and re-emphasized that although the present disclosure may make mention of specific sub-types of UNIs such as "URNs," "DOIs" and "Handles," the present disclosure applies equally well to the more generic types of UNIs, and as such, the present disclosure should be regarded as applying to UNIs in general where any UNI sub-type is mentioned, unless stated otherwise. Furthermore, although the Handle System, DOIs, and their supporting technologies and conventions, which are in use today, are a contemplated forum for the present invention, it should be noted that it is contemplated that the present invention may be applied to other forums based upon current and yet to be conceived conventions and systems.

DOIs

Users employing DOIs to access information know they will resolve and access only associated information. In contrast to URLs that reference locations, DOIs are names for information, which can be used to look up that information's location and other attributes, as well as related services. It is envisioned that information may be any information as well as any computer-readable files, including e-books, music files, video files, electronic journals, software, smaller portions and/or combinations of any of the aforementioned content as well. It should be noted that since the electronic content will be made available over a communications network, hereinafter this application refers to such available information as being published on a communications network.

A DOI is a permanent and persistent identifier given to a piece of information made available on a communications network and registered in an electronic form, so that even if the location (i.e., URL), format, ownership, etc. of the content or associated data changes, users will be able to access the associated data. DOIs, or Handles, may be distributed to users in lieu of a URL. A user may access information associated with a particular DOI by selecting or entering the DOI in a Handle-enabled web browser much like a URL hyperlink. Many types of browsers may be enabled by way of browser plug-in software such as the Handle System plug-in available from www.cnri.org. Such an attempt to access DOI associated information triggers an automated process to look up a resource's current location. The current location of the resource is associated with the resource's DOI in a centrally managed directory made available by the Handle System, which in turn directs the user (i.e., the user's web browser) to the resource's current location. This direction is often accomplished by returning a current URL associated with the selected DOI and corresponding information.

Figure 4:
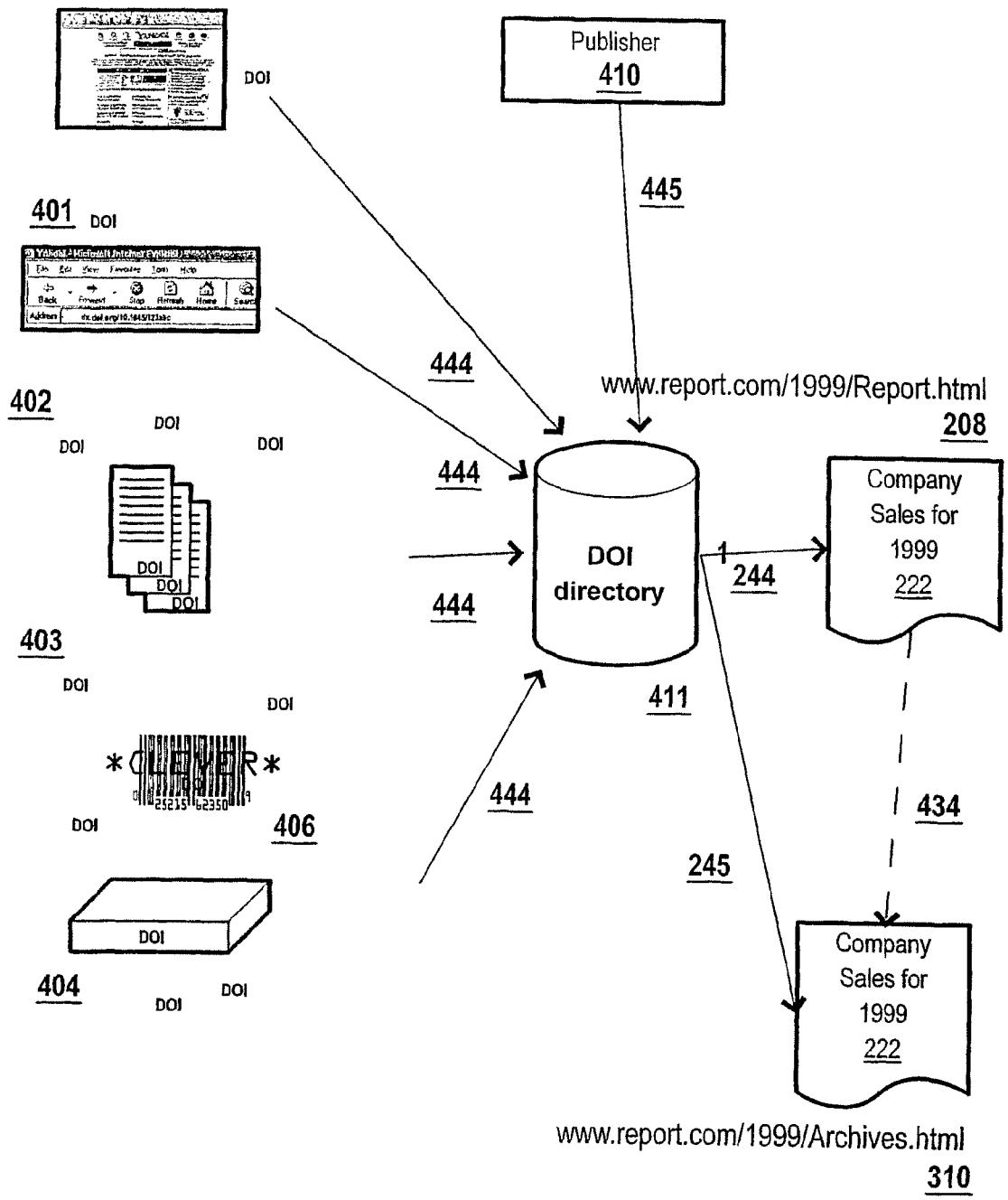
FIG. 4 illustrates accessing of information through DOIs.

FIG. 4 illustrates the access of information through DOIs in contrast to FIGS. 2 and 3 above. Initially, the information (report of "Company Sales for 1999) 222 is given a DOI through a registration process. Instead of employing URLs, users reference 444 the information using the DOI through web pages 401, typed entry in a web browser 402, documents 403, devices 404, barcodes 406, and/or the like. When users engage the DOI links 444, they are resolved in a centralized DOI directory 411 and the requesting users are given a URL link 244 to the information's 222 initial location (www.report.com/1999/Report.html) 208. Upon the information being moved 434 from its initial location (www.report.com/1999/Report.html) 208 to a new location (www.report.com/1999/Archives.html) 310, the publisher of the information 410 would inform the DOI centralized directory 445 of the new location for the information by sending an updated URL 245 referencing the new location. Thereafter, if users 401-404 attempt to access the information through the DOI links 444, the DOI directory will properly provide the new location 310 by way of the updated URL 245.

As noted above, DOIs may not only be used to identify information, but also smaller portions thereof. For example, according to the DOI system, it is possible for a book to have one DOI, while each of its chapters would have other unique DOIs to identify them; furthermore, each figure in the book may have yet other unique DOIs to identify them. In other words, according to the DOI system, it is possible to identify information with variable granularity as desired by the content publishers. Furthermore, it is envisioned that just as Universal Product Codes (commonly expressed as 'bar-codes' on consumer products) allow, for example, a supermarket's cash registers, inventory computers, financial systems, and distributors to automate the supply chain in the physical world, the present disclosure provides a mechanism for employing DOIs to empower all kinds of agents in the world of electronic publishing to automate the sale of digital content (and the licensing of rights to that content) across the Internet in an efficient manner, since each piece of saleable content would have associated with it a globally unique DOI, which could be used as a product identification code in transactions between agents.

Handle Structure

The Handle System employs a pre-determined set of policies for efficient and user-friendly utilization thereof, some of which of which are listed below. The use of the Handle System for DOI resolution should ideally be free to users, with the costs of operation of the system possibly borne by the publishers. All DOIs are to be registered with a global DOI registry. Registrants are responsible for the maintenance of state data and metadata relating to DOIs that they have registered. The syntax of the DOI follows a standardized syntax. In use, the DOI will be an opaque string (dumb number). DOI registration agencies will manage the assignment of DOIs, their registration and the declaration of the metadata associated with them.

Figure 5:
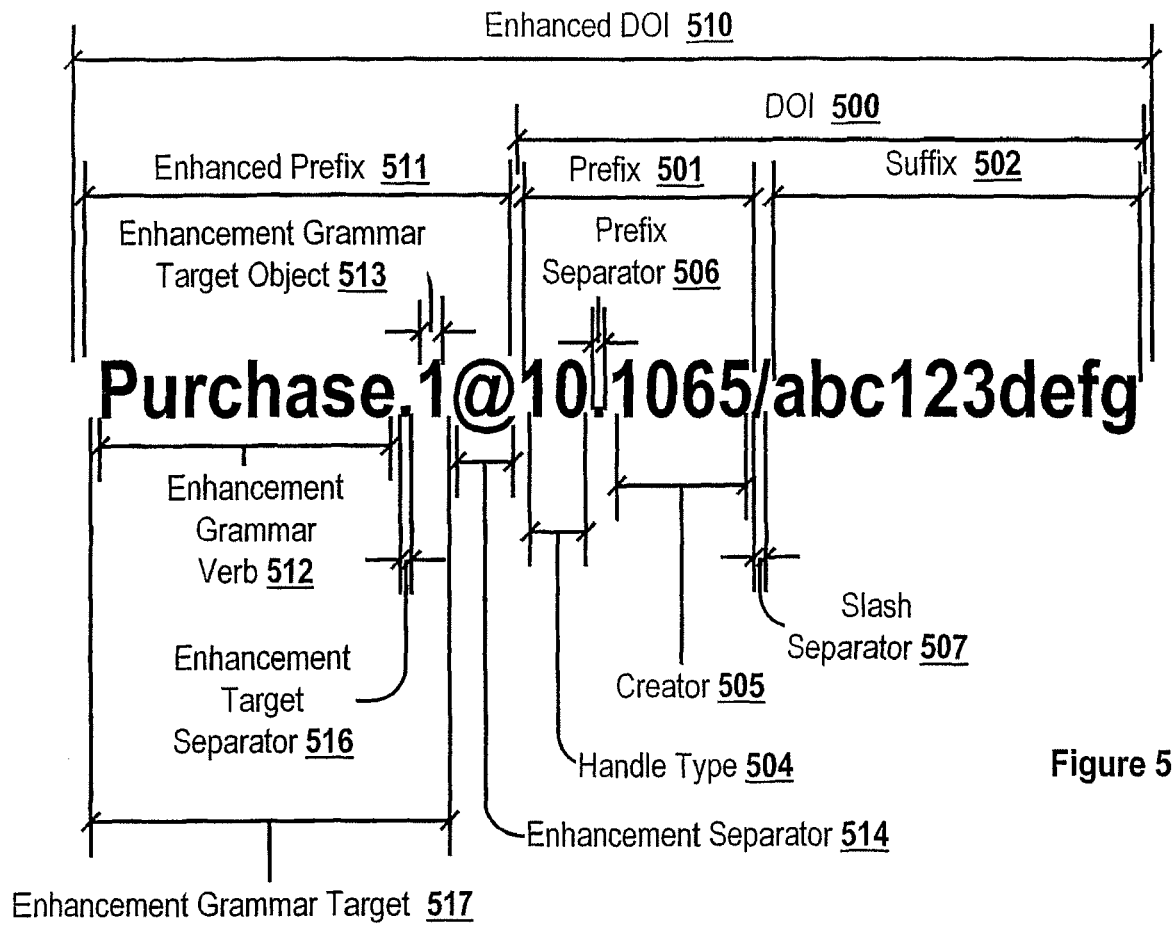
FIGS. 5 and 6 provide an overview of a Handle.
Figure 6:
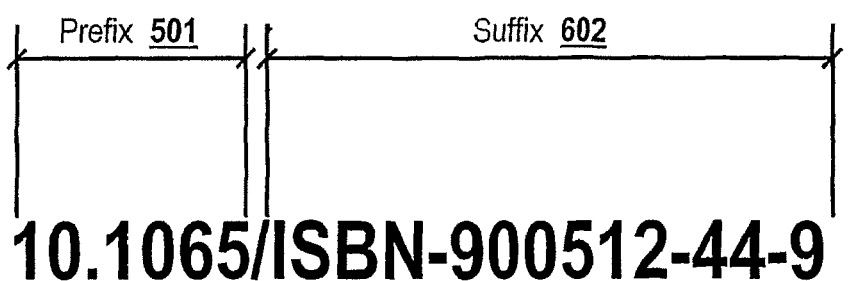

FIGS. 5 and 6 provide a schematic view of a Handle 600. A Handle 600 has two components, the prefix 501 and the suffix 602. The prefix 501 and the suffix 502 are separated by a forward slash 507. The Handle 500 may incorporate any printable characters from almost every major language written or used today. There is no specified limitation on the length of either the prefix 501 or the suffix 502. As a result, it is envisioned that there are an almost infinite number of Handles available. It is important to ensure that the combination of the prefix 501 and the suffix 502 is unique for supporting the integrity of the Handle System. Thus, the DOI registration agency will award a unique prefix 501 to a publisher. In one embodiment, the registration agency may put the responsibility on these publishers for ensuring that the suffix 502 assigned is unique as well. This may be achieved with a registration tool running on the user's client computer system. In another embodiment, the registration agency will ensure that the suffix 502 is unique by applying various suffix generation algorithms as discussed throughout this disclosure. The Registration Agency and the Handle System administrators will both verify uniqueness of any new Handle before depositing it in the Handle System. The Registration Agency deposits DOI records with the Handle System. The Handle System in turn services DOI resolution requests through a DOI directory.

The prefix 501 itself has two components separated by a prefix separator 506, which is a period. The first part of the Handle prefix is the Handle type 504. The second part of the Handle prefix is the Handle creator 505. The Handle type 504 identifies what type of Handle system is being used. When the Handle type 504 starts with a "10" the Handle is distinguished as being a DOI as opposed to any other implementation type of the Handle System. The next element of the prefix, separated by a period, is the Handle creator 505, which is a number (or string of characters) that is assigned to an organization that wishes to register DOIs. Together, these two elements 504 and 505 form the unique publisher prefix portion of the DOI. There is no limitation placed on the number of Handle (or specifically DOI) prefixes that any organization may choose to apply for. As a result, a publishing company, for example, might have a single DOI prefix 501, or might have a different one for each of its journals, or one for each of its imprints. While generally a prefix 501 may be a simple numeric string, the scope of the Handle System is not limited thereby. Thus, a prefix 501 may also utilize alphabetical characters or any other characters.

The suffix 502 is a unique string of alphanumeric characters, which, in conjunction with a particular prefix 501, uniquely identifies a piece of information. It should be appreciated that the combination of the prefix 501 for a publisher and the unique suffix 502 provided by the publisher avoids the need for the centralized allocation of DOI numbers. The suffix 502 may be any alphanumeric string that the publisher chooses, so long as it is unique among all suffixes registered in conjunction with the publisher's prefix.

FIG. 6 provides a view of another embodiment of the DOI 600, in which a textbook's ISBN number serves as the suffix 602. Consequently, where it is convenient, the publisher of the underlying content may choose to select as the suffix 602 any other identification code accorded to the original piece of content.

Enhanced DOI

FIG. 5 further illustrates an enhanced DOI 510 grammar. One non-limiting example embodiment of an enhancement to the DOI grammar is embodied as an enhanced prefix 511. However, it is fully contemplated that an alternative and/or complimentary enhanced suffix (not illustrated) may be similarly appended to the DOI 500. The enhanced prefix 511 is comprised of an enhancement grammar target 517 and enhancement separator 514, which is an "@" symbol, but it is understood any other character may be designated as the enhancement separator. The enhancement grammar target 517 may itself be any string of characters other than the enhancement separator 514. The enhancement grammar target 517 may be employed for the purpose of having the DOI 500 resolve to multiple versions of a specified information as will be described in greater detail throughout this disclosure. In a further enhanced embodiment, the enhancement grammar target 517 may itself be further comprised of an enhancement grammar verb 512 and enhancement grammar target object 513 separated by an enhancement target separator 516, e.g., a period. Of course the enhancement target separator 516 may be designated as any character(s). In one example embodiment, the enhancement grammar verb 512 acts as a modifier to select amongst a plurality of multiple resolution targets for a DOI, and the enhancement grammar target object 513 is a value passed to the target object and/or a Handle system resolution server for further action.

Handle System Metadata

A DOI 500 is merely an identification number that does not necessarily convey any information about its associated information. As a result, it is desirable to supplement the DOI with additional information regarding the addressed information to enable users to perform efficient and user-friendly searches for retrieving the desired content over a communications network. To allow easy identification of information, the present invention provides for the use of metadata, which is descriptive data about the identified information. While metadata may be any data-structure that is associated with a DOI, according to one embodiment, the metadata will be comprised of a few basic fields that can accurately and succinctly identify the published information. According to this embodiment, the metadata will comprise an identifier associated with the entity from a legacy identifier scheme such as the International Standard Book Number (ISBN) for a book, title of the published content, type of content being published (such as book, music, video, etc.), whether the content is original or a derivation, a primary author of the content, the role of the primary author in creating the content, the name of the publisher, and/or the like. As different types of content may require different metadata for describing it, one aspect of the DOI system envisions the use of different metadata for different types of content.

According to one example embodiment, metadata will be made available to any user of the DOI system to enable them to find the basic description of the entity that any particular DOI identifies. This basic description will allow the user to understand some basic things about the entity that published the content or the content itself.

As a result, to find out what information the DOI identifies, it is desirable to resolve it, and then review associated metadata because the DOI links the metadata with the content it identifies and with other metadata about the same or related content. In one embodiment, the metadata allows for the recognition of the information identified by the DOI 500 as well as its unambiguous specification. The metadata will also allow for the interaction between the information and other contents in the network (and with metadata about those entities).

DOI Information Access

Figure 7:
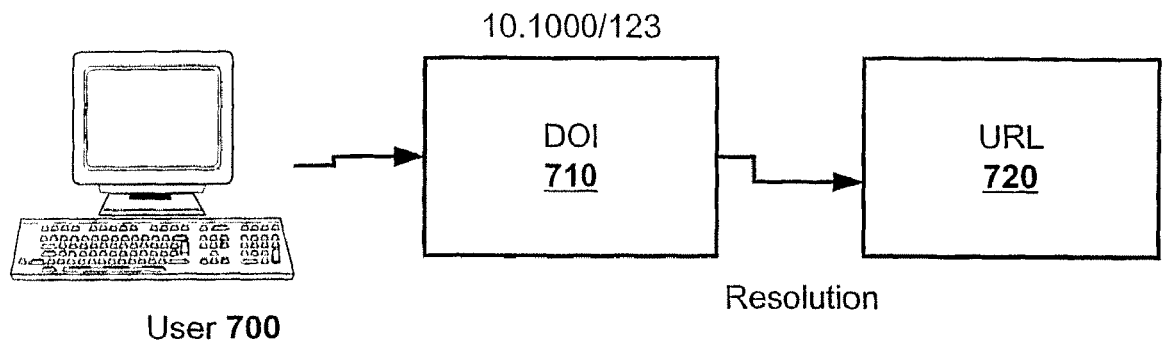
FIGS. 7 and 8 provide an overview of the resolution mechanism for allowing users to access desired information.
Figure 8:
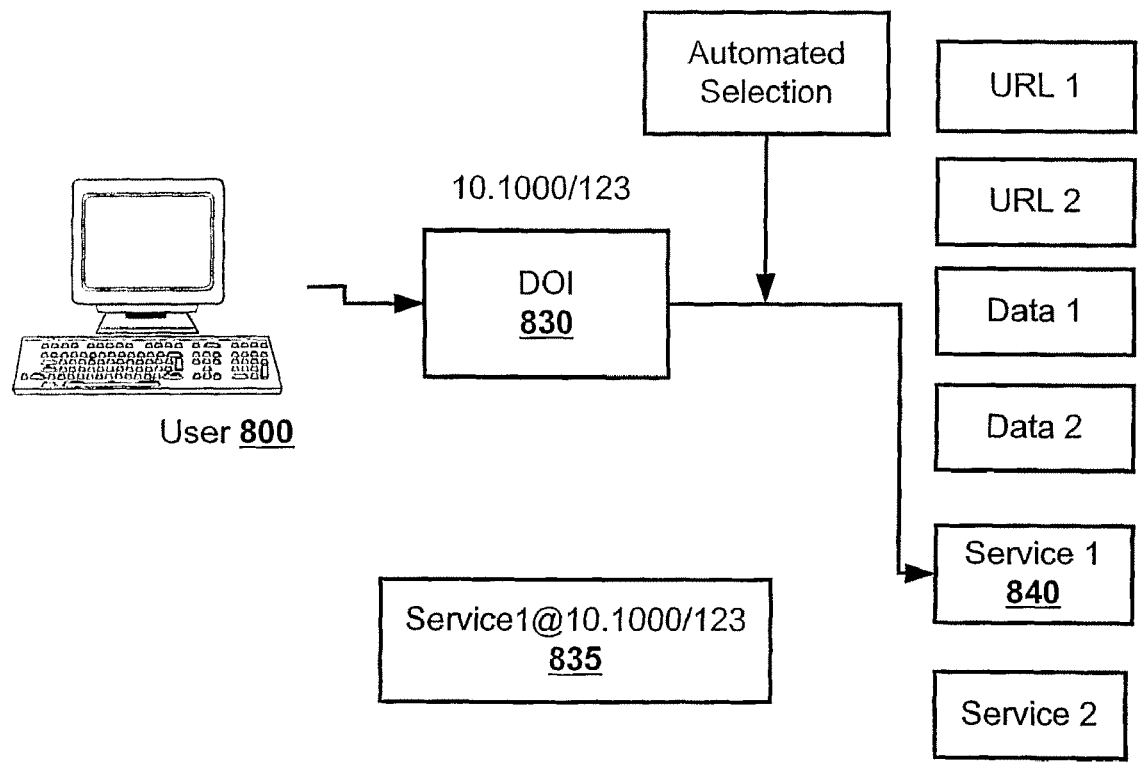

FIGS. 7 and 8 provide an overview of the resolution mechanism for allowing users to access the desired information by merely providing the DOI to the DOI Handle system. Resolution in the present context includes the submitting of an identifier to a network service and receiving in return one or more pieces of current information related to the identifier. According to one embodiment of the DOI system, shown in FIG. 7, the user uses her web browser 700 client to point to content identified by a particular DOI 710. This DOI 710 has only one URL associated with it, and must resolve to that URL. As a result, when the user makes a request for underlying content identified by a particular DOI 710, the user is directed to URL 720, where the desired content lies.

As such, this mechanism allows the location of the information to be changed while maintaining the name of the entity as an actionable identifier. If the publisher changes the location of the content, the publisher must merely update the DOI's entry in the Handle System database to ensure that the existing DOI 710 points to the new location of the content. As a result, while the location of the content has changed, the DOI remains the same and users are able to access the content from its new location by using the existing DOI.

FIG. 8 provides an overview of a DOI system where users may use a DOI for resolving a request for one piece of content, out of a plurality of available identical copies of the same piece of content that are identified by the same DOI, as well as the location of data about the piece of content, and services associated with the content (such as purchasing the content). Thus, the user uses the web browser 800 and provides the necessary DOI 830. The DOI 830 may be structured to describe the type of service desired 835. As a result, the DOI system is able to resolve the particular piece of content 840 that the user desires to access.

Figure 9:
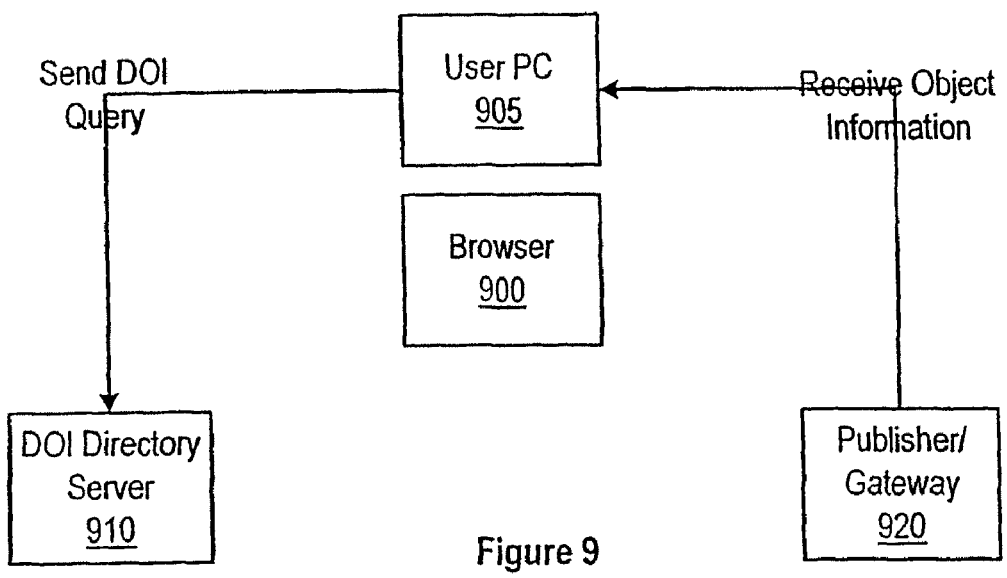
FIG. 9 provides an overview of an exemplary sequence of actions that a user performs to access information using DOIs.

FIG. 9 provides an overview of the sequence of actions that a user performs to access information, in accordance with the present invention. Initially, the user launches the browser client 900 on a computing device 905, such as personal computer, personal digital assistant (PDA), and/or the like. The user engages the browser 900 to make a DOI query. The DOI query is forwarded to the DOI Directory Server 910 over a communications network. The system of the DOI Directory Server 910 examines the DOI against the entries stored therein and forwards the appropriate URL to the browser 900 on the user's computer 900, in a manner that is invisible to the user. As a result, the browser is pointed to the desired content on a server with the appropriate publisher information 920. Finally, upon receipt of the request from the user's browser, the publisher 920 forwards the desired information to the user, which may be accessed in the browser client 900.

Figure 10:
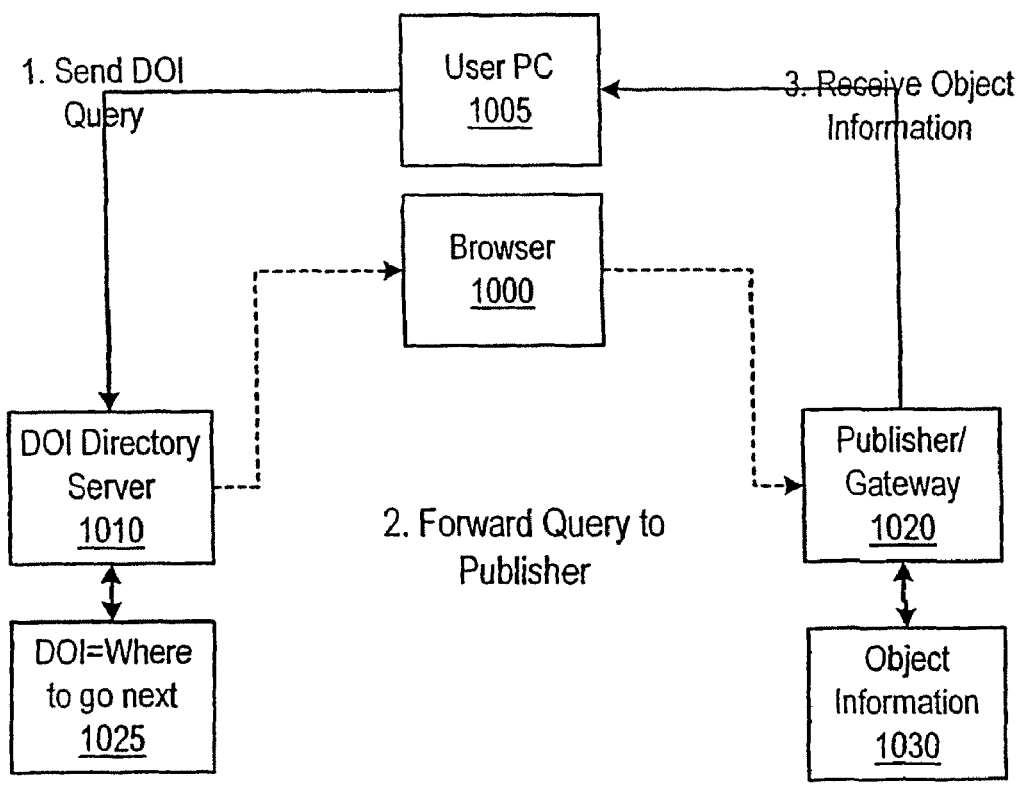
FIG. 10 provides a more complete overview of an exemplary sequence of actions that users perform to access content information.

FIG. 10 provides a more complete view of the sequence of actions that a user performs to access content information, as shown in FIG. 9. As noted above, the user launches the browser client 1000 on a computing device 1005. The user engages the browser 1000 to make a DOI query. The DOI query is forwarded to the DOI Directory Server 1010 over the communications network. The system of the DOI Directory Server 1010 examines the DOI against the entries stored therein. As a result of the checking of the DOI against the entries stored in the DOI Directory Server 1010, the DOI Directory Server 1010 determines where the DOI must lead the user 1025. The appropriate URL for the content is automatically forwarded to the user's browser 1000, without any intermediate intervention or action by the user. As a result, the browser 1000 is pointed to the appropriate publisher 1020 whose server is addressed by the underlying URL. The URL is used by the publisher's server 1020 to determine the exact location for content desired by the user, and the publisher's server 1020 forwards the appropriate content 1030 to the user.

Figure 11:
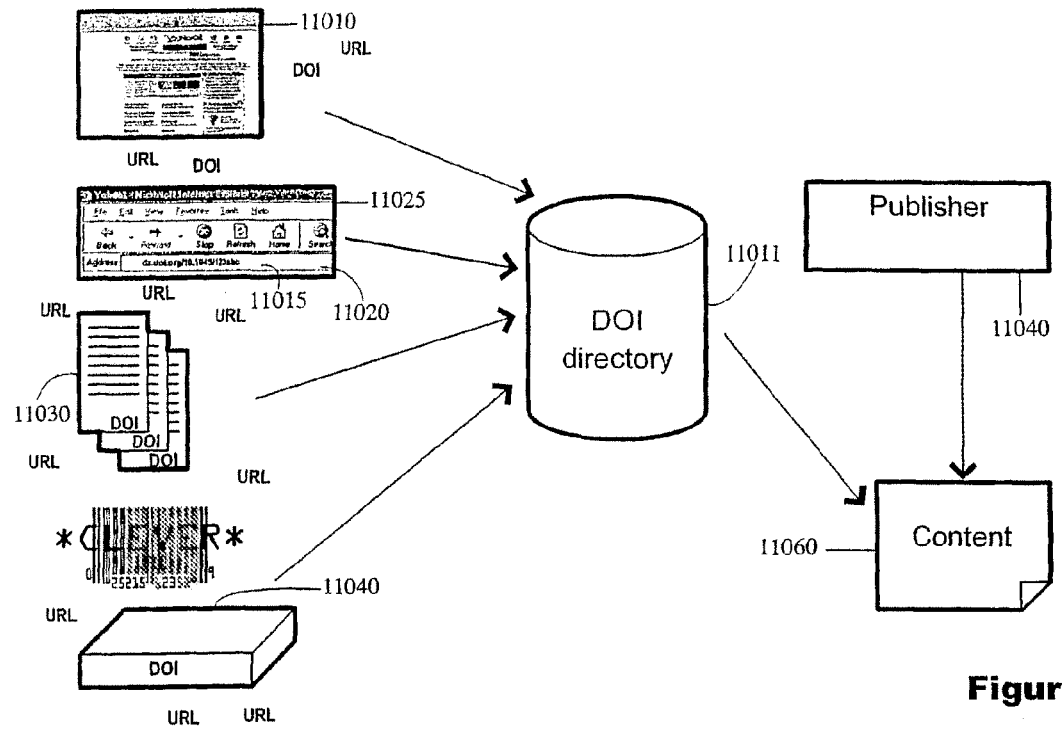
FIG. 11 illustrates an exemplary mechanism for accessing information over a communications network.

FIG. 11 provides an overview of some of the exemplary mechanisms for accessing information over a communications network by resolving a DOI to obtain the URL where the desired content is located, in accordance with the present invention. According to one embodiment, the user may directly provide the DOI and the DOI system retrieves and forwards the appropriate content to the user by simply linking to the appropriate URL. According to another embodiment, the user may provide information related to some of the fields included in the metadata, whereupon a DOI lookup service identifies the appropriate DOI, which in turn may be resolved to the desired content's location. As shown in FIG. 11, according to one embodiment, a search engine 11010 may be provided to a user. In one embodiment, the search engine is offered and disposed in communication with the registration agency's DOI and metadata database. In an alternative embodiment, a search engine such as www.google.com may be adapted to submit queries to the registration agency's databases. The user searches for the appropriate DOI by providing some identifying information to the search engine 11010. The search engine 11010 uses the identifying information provided and searches a database of metadata to retrieve the DOI associated with the provided metadata information. Thus the user conducting the search may be presented with returned DOIs from the metadata database and/or URLs resolved from said returned DOIs. The retrieved DOI is sent to the DOI directory 11011, which resolves the URL wherein the desired content is located by a publisher 11040. Finally, the user's browser is pointed to the appropriate content 11060.

According to another embodiment, the user may provide the DOI 11015 in the address window 11020 of a browser 11025. If the user's web browser is not capable of natively processing DOIs, then the DOI 11015 may contain the address of a proxy server for the DOI directory 11011, which in FIG. 11 is "dx.doi.org." As a result, the browser is pointed to the DOI directory 11011 located at dx.doi.org, which resolves the URL at which the desired content is located by a publisher 11040 and points the user's browser thereto.

According to another embodiment, the DOI may be embedded in a document or some form of information 11030, whereupon clicking the DOI directs the user to the appropriate DOI directory 11011, which determines the URL at which the desired content is located and points the user's browser thereto.

According to another embodiment, the DOI may be provided on a memory 11040, such as a CD-ROM or a floppy disk, whereupon the memory may automatically, or upon being activated, direct the user to the appropriate DOI directory 11011, which resolves the URL at which the desired content is located and points the user's browser thereto.

According to yet another embodiment, the DOI may be provided in printed form to a user, who enters the DOI manually as above or by way of optical and/or mechanical peripheral input device.

Figure 12:
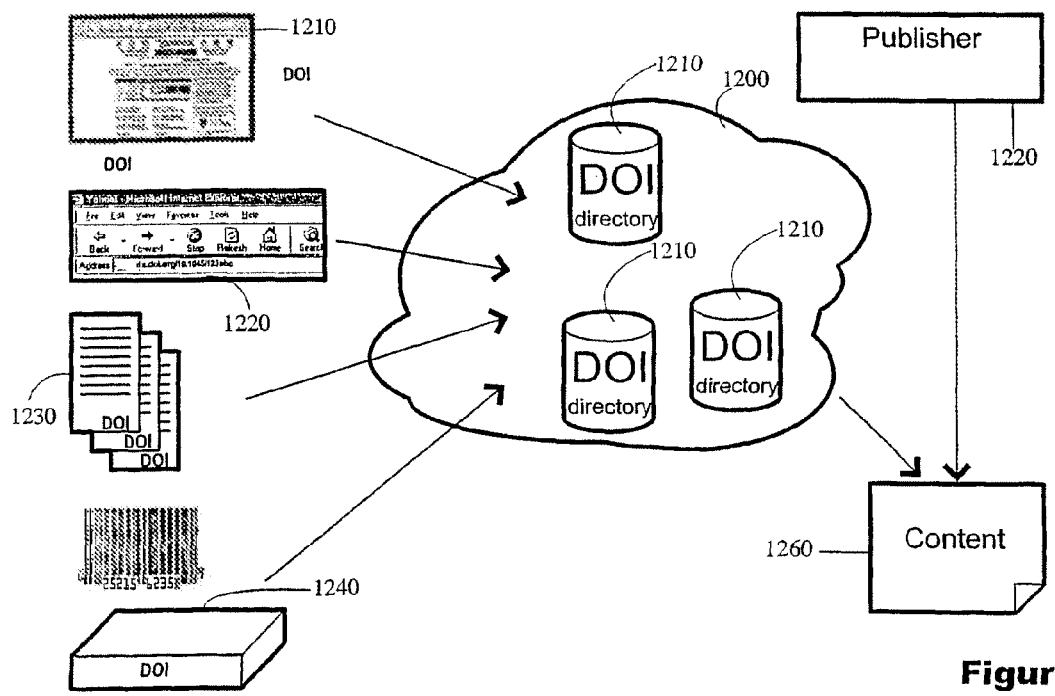
FIG. 12 provides an overview of another embodiment of exemplary mechanisms for retrieving information over a communications network.

FIG. 12 provides an overview of another embodiment of the exemplary mechanisms for retrieving information over a communications network, whereupon the DOI system resolves a DOI to obtain the URL where the desired information is located. According to this embodiment, a plurality of DOI directories 1210 exist as a distributed DOI directory and form a Handle System 1200. In one embodiment, the distributed DOI directory acts and responds to requests as if it were a singular directory 11011. Otherwise resolutions take place similarly as in FIG. 11.

Figure 13:
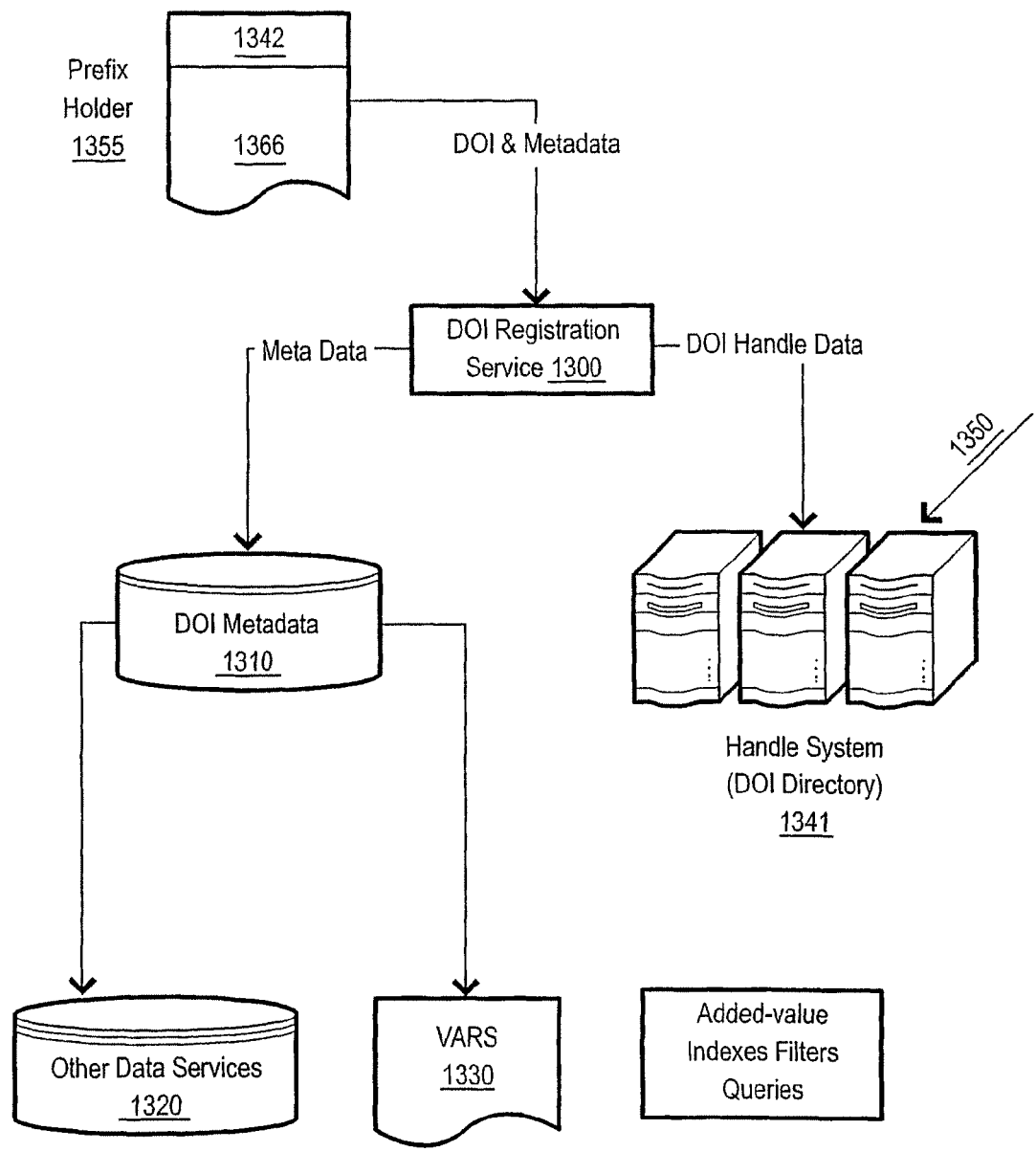
FIG. 13 provides an overview of an exemplary DOI system.

FIG. 13 provides an overview of an exemplary DOI system, in accordance with the present invention, wherein the publishers, the DOI registration service and the Handle System collaborate together to create an efficient DOI system. The prefix holder 1355 may submit information to a DOI registration service 1300 comprising a DOI 1342 and associated metadata 1366. The prefix holder who has already been assigned a unique prefix 501, requests that a suffix 502 be assigned to a piece of content 1366. The registration service 1300 is responsible for parsing and/or reformatting the user's streams of submitted information 1342, 1366 for subsequent deposit in a Handle system 1350 and/or metadata database 1310. As noted above, the scope of the content that can be addressed using a DOI is unlimited. As a result, the content 1366 may comprise any information and work of authorship, including articles, books, music albums, or selected discrete portions thereof. In addition to providing a DOI 500, the publisher 1342 collects metadata for the content 1366. The metadata may comprise the content's DOI 500, a DOI genre, an identifier, title, type, origination, primary agent, agent's role, and/or the like. It may also comprise listings of associated services having to do with the identified piece of content offered by various parties, such as the locations of web pages where a piece of content may be purchased online.

Once the publisher 1342 has assigned the suffix 502 to the content 1366 and collected the necessary metadata, the DOI 500 and the metadata are transmitted to the DOI registration service 1300. The DOI registration service 1300 maintains a database of DOIs 500, metadata of all the registered content 1366, as well as the URL at which the content 1366 is located. According to the present invention, the DOI registration service 1300 forwards the metadata to a metadata database 1310, 119c of FIG. 1, which may or may not be integrally maintained by the DOI registration service 1300.

The DOI registration service 1300 may use the collected metadata for providing it to other data services 1320 or for providing value added resources 1330 to the users. In addition, the DOI registration service 1300 sends the appropriate DOI Handle data to the Handle System 1350, which may comprise a plurality of DOI Directory Servers 1341.

Personal DOI Registration System Data Flow

Figure 14:
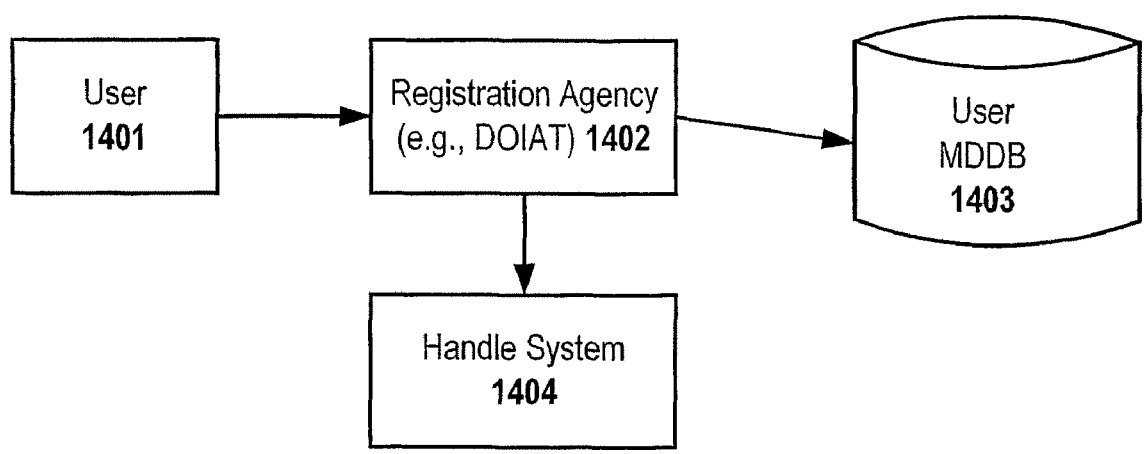
FIG. 14 depicts a data flow diagram for a personal DOI registration system for tracking information access.

FIG. 14 depicts a data flow diagram for a personal DOI registration system for tracking information access. A user 1401 may employ a client and/or peer for accessing information. The user is disposed in communication with a registration agency 1402, e.g., DOIAT 101. The handle system registration agency (hereinafter "registration agency") 1402 in turn is disposed in communication with a user metadata database (hereinafter "MDDB") 1403. The registration agency 1402 is also disposed in communication with a handle system 1404.

The personal DOI registration system allows a user to register a DOI that is to be associated with the user's person, the user's device representing his or her person, and/or the like. Registration of a DOI to represent one's person may be achieved in several ways, such as, but not limited to: obtaining personal information regarding an individual and saving it to a record in a personal DOI database 119e of FIG. 1 and having the registered DOI resolve to said database record; obtaining personal information regarding an individual and saving it to a record in an MDDB, and/or the like.

The personal information may include, but is not limited to such fields as: Name of Individual, Address, Telephone Number, Social Security Number, Representative Hardware Device, Reference to Representative Hardware Device, Credit Information, Medical Information, Company Account Information, Custom Records, and/or the like. It should be noted that the above fields may store actual values or DOIs, e.g., the Reference to Representative Hardware Device may be either an IP address or a DOI. A representative hardware device may be any device that may communicate over a communications network. An individual may have several DOIs registered representing his/her person, or alternatively maintain a single universal DOI representing him/herself. In some deployments, a DOI representing a person will be created by an entity other than the individual, e.g., a corporation, while in other deployments entities may make use of a DOI and accompanying personal information maintained by the individual him/herself. In an alternative embodiment, the facility of obtaining personal DOI information and storing it may be handled by a tertiary facility, e.g., a personal information database warehouse facility, that then engages and registers and obtains a referencing DOI for each personal record.

Personal DOI Registration System Logic Flow

Figure 15:
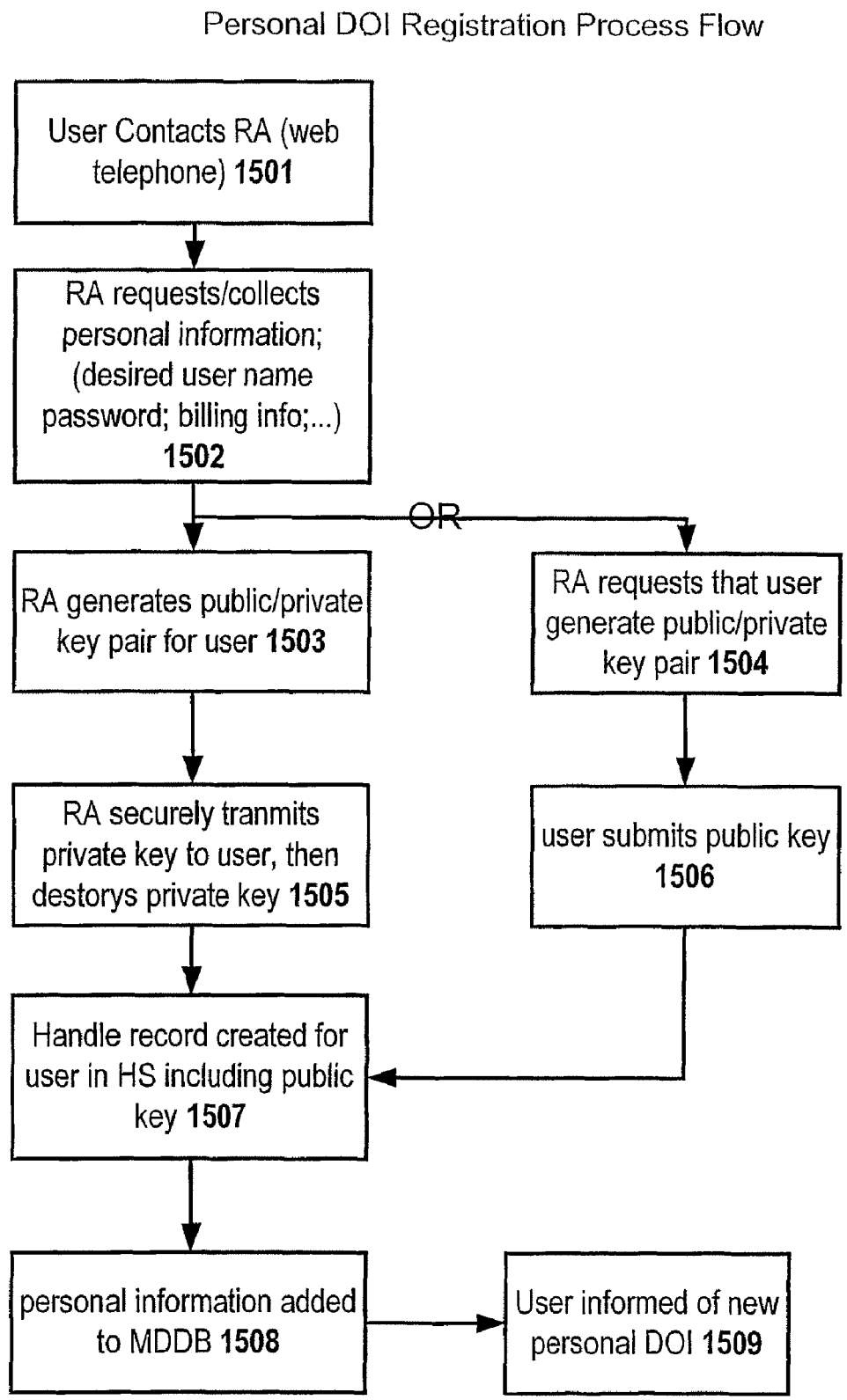
FIG. 15 depicts a logic flow diagram for a personal DOI registration system for tracking information access.

FIG. 15 depicts a logic flow diagram for a personal DOI registration system for tracking information access. Initially, a user contacts a registration agency, e.g., an Information Access Registration Server (IARS), for registering DOIs associated with information. The user may contact the registration agency by web, telephone, and/or the like 1501. Upon contacting the registration agency 1501, the registration agency provides a mechanism to collect personal information with regard to the user 1502. In one non-limiting example embodiment, the registration agency provides a web form allowing the user to enter personal information for subsequent entry of a database record that will be associated with a registered DOI. In one non-limiting example embodiment, the personal information includes a desired user name and password, billing information, address, transaction information (as already discussed above), and/or the like.

Upon obtaining the user's personal information 1502, the registration agency generates a public and private encryption key pair for the user 1503. Any number of encryption techniques may be employed as already discussed in FIG. 1. Upon generating a public/private key pair for the user 1503, the registration agency will securely transmit the private key to the user across a communications network and then destroy that private key 1505. The private key securely may be transmitted by employing secure transfer protocols such as, but not limited to, https, SSL, digital certificates, and/or the like. In an alternative embodiment, the user's client/peer includes a facility to produce the public and private encryption key pair locally 1504. In yet another embodiment, the registration delegates generation of the keys to a tertiary server with a cryptographic server suited for such key production. Thus in the alternative, upon the registration agency collecting personal information 1502, the registration agency may request that the user generate a private key pair 1504. The user may submit the public key to the handle system 1506. Upon securely transmitting the private key to the user 1505, the registration system creates a record in the handle system representing the user, i.e., the personal DOI information, and including the public key that was generated 1503, 1507 and/or submitted 1506. Thus, a user's identity and key are associated with the user's person and/or user's representative device. Upon creating a handle record to resolve a DOI with a user 1507, the personal information that was collected earlier is added to the metadata database keyed under the DOI that was generated to represent the user 1508. Upon having his or her personal information added to the metadata database 1508, the user is informed of the new personal DOI representing the user's person 1509.

Public Key Infrastructure Authentication for Content Access System Data Flow

Figure 16:
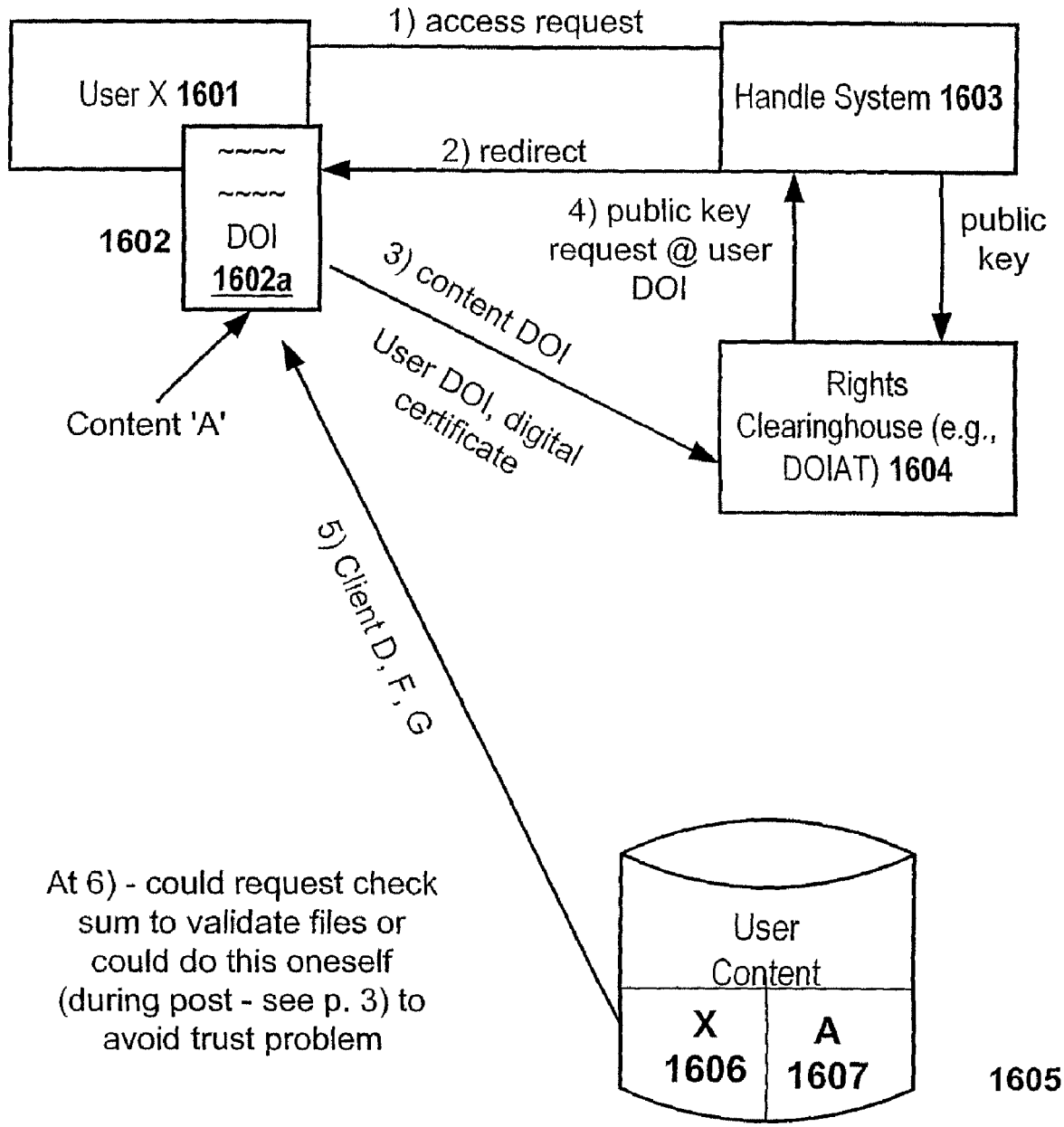
FIG. 16 depicts a public key infrastructure authentication for content access system for tracking information access.

FIG. 16 depicts a public key infrastructure authentication for a content access system to track information access. In one non-limiting example embodiment, a user "X" 1601 may attempt to engage and/or access a piece of content "A" 1602. Content may be stored on a local storage device and/or like form of memory. The content itself contains a DOI 1602a. Upon engaging and/or accessing the content, the user's client/peer will interpret the DOI from the content and generate an access request based on the content DOI with the handle system 1603. The user's client can so engage the handle system by simply reading the DOI tag 1602a along with the rest of the accessed content. The user's client is designed to parse and respond to discerned DOI tags by requesting a DOI resolution of any identified DOI tags. Current media players may be augmented with such DOI response facilities through plug-ins, patches, and/or the like. For example, Windows Explorer, Microsoft Internet Explorer, Netscape Navigator, Windows Media Player, WinAmp, MusicMatch, and/or the like have published APIs and plug-in facilities allowing for such DOI resolution facilities to be integrated within.

Upon obtaining the DOI access request, the handle system will redirect the user's client to the rights clearinghouse responsible for managing digital rights for the accessed content 1604, e.g., DOIAT 101 of FIG. 1. In one non-limiting example embodiment, the user's client will provide various items to the rights clearinghouse 1604 to enable access to the content 1602 by way of a clear-rights message. For example, user X's client will supply the rights clearinghouse 1604 with: a DOI for content "A" (which may be obtained either from the content itself), and a DOI associated with user X (and/or, optionally, a digital certificate to the rights clearinghouse 1604). The rights clearinghouse 1604 maintains a storage device that contains a database and/or data-structure (hereinafter "rights DB") 1605 associating content 1607 with user rights 1606. This association may be embodied in standard data structures such as, but not limited to: a (linked value paired) list, table(s), struct, and/or the like. The content table 1607 may store records of DOIs for content keyed to the user table 1606 or vice versa. Both the content table 1607 and user table 1606 store DOIs representing content and users, respectively. Either the content or user tables may be key fields as they are both guaranteed to contain unique values through registration with the handle system.

The rights clearinghouse may use the user's DOI, which was sent by and represents the user, to request a public key associated from the handle system 1603. In one non-limiting alternative embodiment, the clearinghouse 1604 makes this request employing an enhanced DOI grammar and multiple-resolution, e.g., get.publicEncryptionKey@DOI. The handle system 1603 returns the public encryption key to the clearinghouse 1604 based on the user's DOI 1601. Alternatively, the handle system 1603 will redirect the clearinghouse 1604 to obtain the public encryption key associated with the user's DOI from a tertiary source housing users' public encryption keys.

Obtaining the user's public key allows the clearinghouse to determine the identity of the user, and send information securely back only to the intended/authorized user. In one non-limiting alternative embodiment, this may be achieved by the rights clearinghouse using the obtained public key to decrypt the digital certificate that was optionally provided by the user. The decrypted digital certificate may include a password, or other verification information that may required for further action by the rights clearinghouse for added security purposes. Upon verifying the user's identity if at all, the clearinghouse 1604 may query its rights DB 1605 based on information supplied by the user in its clear-rights message. Namely, the user supplied user DOI and content DOI may be used by the rights clearinghouse 1604 to query the rights DB 1605 to further determine if a given user has rights for a given item of content. For example, if user X supplies the rights clearinghouse 1604 with a content DOI "A" and the user's DOI "X," then the rights clearinghouse will identify that user X does have certain rights for content A in the rights DB 1605.

When a user is found to have rights in an item of content, the rights clearinghouse will retrieve access/decryption materials from the rights DB 1605 to enable the user to make use of and/or access the requested content 1602. This may be achieved by simply reading a Rights_Access field from the appropriate field resulting from the rights DB query.

Optionally, the rights clearinghouse 1604 may then encrypt the access/decryption materials for the requested content, e.g., content "A," with the user's, e.g., X's, associated public encryption key that was retrieved by resolution of the user's DOI. The rights clearinghouse 1604 may then use the user's DOI and engage the handle system 1603 to resolve to the user's location, e.g., IP address. Upon resolving to the user's location by way of the user's DOI, the access/decryption materials for the requested content are forwarded to the user's client 1601. Using the user's DOI at the clearinghouse 1604 for resolution further ensures that the appropriate user is provided with the access/decryption materials. Optionally, if the access/decryption materials sent by the clearinghouse 1604 are themselves encrypted with the user's public key associated with the user's DOI, then the user's client 1601 may use the user's private key to decrypt the access/decryption materials. Thereafter, the access/decryption materials may be used by the user's client(s) to engage and/or otherwise access the accessed content 1602.

It should be noted that records in the content table 1607 may be modified with an entry indicating the content was accessed/used (including the time of use by a particular user), and similarly that records in the user table 1607 may be modified with an entry indicating the user accessed/used content (including the time of use). Such tracking of use allows for aggregating use reports, tracking the amount of use by user, by content item, by time, and/or other such attributes.

Public Key Infrastructure Authentication for Content Access System Logic Flow

Figure 17:
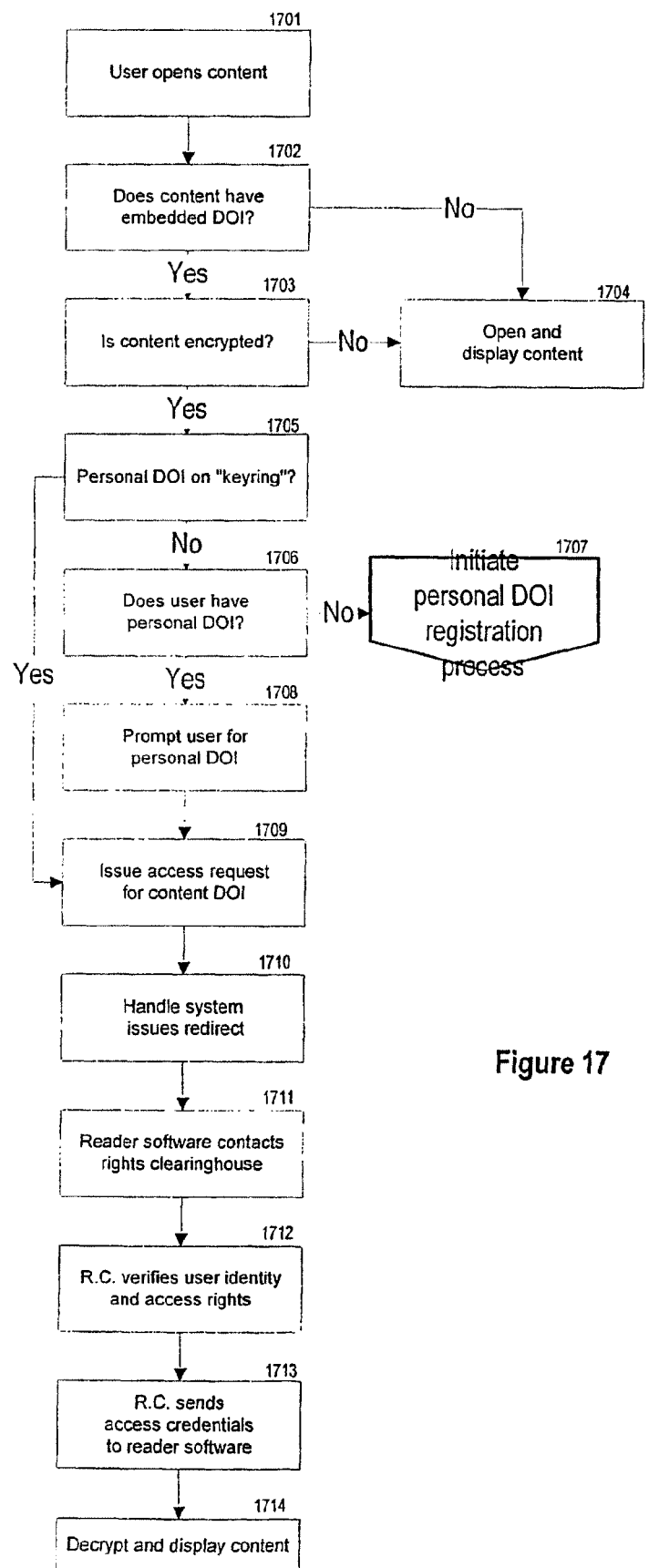
FIG. 17 depicts a logic flow diagram for a public key infrastructure for content access for information tracking.

FIG. 17 depicts a logic flow diagram for a public key infrastructure for content access for information tracking. In one non-limiting example embodiment, a user accesses content 1701. The user may access and/or open up content by employing a peer, a client, an application, and/or the like. Upon the user accessing the content 1701, the Public Key Infrastructure (PKI) authentication system determines if the content has an embedded DOI 1702. If the content does not have an embedded DOI 1702, then the peer provides access to the content 1704. If the content does have an embedded DOI 1702, then the PKI authentication system determines if the content is encrypted 1703. If the content is not encrypted 1703, then the PKI authentication system provides access to the content 1704. If the content is encrypted 1703, then the PKI authentication system determines if a personal DOI exists on the user's key ring that is accessible by way of the user's system 1705. A key ring may simply hold a singular and/or a plurality of validation and/or authentication mechanisms such as, but not limited to: passwords, digital certificates, (personal) DOIs, and/or the like. A key ring may be embodied in a simple file, in a cookie, in an encrypted file and/or the like.

If no DOI representing the user's person is found on a key ring 1705, then the PKI authentication system determines if the user has a DOI representing his or her person 1706. This may be determined by querying a metadata database based on the user's personal information and examining if personal DOIs result. If the user has no personal DOI representing his or her person, then a personal DOI registration process is initiated 1707 as discussed above in FIG. 15. If a person does have a DOI representing his or her person 1706, then the user is prompted for their personal DOI 1708. Any number of mechanisms may be employed to obtain the person's personal DOI such as a text entry field 1708. Upon prompting and obtaining a user's personal DOI 1708, the PKI authentication system issues a request for a redirect based on the requested content's DOI 1709. Alternatively, if the user's personal DOI was available on a key ring 1705, the PKI authentication system will issue a request for content based on the person's DOI thereafter 1709.

Upon issuing an access request for content based on a content DOI 1709, the PKI authentication system obtains a redirect from the handle system identifying an appropriate clearinghouse that will supply access/decrypt materials (i.e., access credentials) to the user's client that will enable access to the accessed content 1710. In one non-limiting example embodiment, access credentials are materials enabling access to the content such as, but not limited to: access codes, decryption keys, digital certificates, DOIs, passwords, and/or the like. Upon being redirected by the handle system 1710, the user's client will contact the rights clearinghouse 1711. Upon contacting the rights clearinghouse 1711, the rights clearinghouse will verify the user's identify and access rights 1712. The rights clearinghouse may verify the user's identity because the client provided the rights clearinghouse with client verification information 1712. Client verification information comprises the user's personal DOI, the DOI representing the desired content to be accessed; and client verification information may also include: a digital certificate, passwords, access codes, encryption keys, DOI verification information, and/or the like. It should be noted that enhanced DOI grammar may be used to reference the client verification information; e.g., validate.key1@ClientPersonalDOI, decrypt.key2@DesiredContentDOI, etc. The rights clearinghouse may use the client's DOI to resolve to verification information via the Handle System and use that information to either decrypt verification information provided by the client, compare to verification information provided by the client, and/or the like. Upon successfully determining that the client is who he/she/it claims to be, then the rights clearinghouse may determine if the client has rights to access the desired content. This may be achieved in a number of ways such as, but not limited to: resolving the content DOI to see if there is an entry showing the user has rights to use the content, resolving the client DOI to see if there is an entry to unlock the desired content, simply querying a rights access database for the client's entry, and/or the like. Upon verifying the user's identity and access rights 1712, the rights clearinghouse provides access credentials to the user's client 1713. Upon obtaining access credentials from the rights clearinghouse 1713, the user's client may decrypt and/or access the desired content by employing the access credentials that were received from the rights clearinghouse.

Chained Referencing of Security Information

It should be noted that security information such as access credentials, validation information, verification information, and/or the like may also be registered with a DOI in the handle system. For example, a DOI may be assigned to a digital certificate, a decryption key, or even a password. Thus, not only may a DOI be the source of validation and access requests, but it may also be the target of such requests. In this "chained referencing" manner, an enhanced DOI access request, e.g., get.publicEncryptionKey@DOI, may return the DOI for a public decryption key instead of a URL to the public decryption key or the public decryption key itself.

In one non-limiting example embodiment, such chained referencing of security information may be used to enhance security. Such a security system moves the actual security information itself, e.g., encryption keys, periodically from server to server as a security measure. The chained referencing and employment of DOIs for the security information prevents all the programs and systems that reference the security information, e.g., keys, from suddenly "breaking" because the URLs or location addresses have changed. In another example embodiment, such chained referencing may be applied to to an authentication record (within the handle system) itself. The chained referencing permits the creator or owner of the authentication record itself to create their own multiple-resolution options associated with that DOI. Example resolution options associated with the authentication record itself may include, but are not limited to: returning a value of a public key; returning additional information (e.g., metadata) about the owner of security information (e.g., a key); returning additional information (e.g., metadata) about the security information itself (e.g., when it was created, under what terms, with what level of security clearance, etc.).

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed is:

1. A method of using at least one computer to effect access to information, comprising:
    collecting information regarding an entity (entity information), wherein the entity is represented by the entity information (EREI);
    generating an unique, persistently accessible, and universal name identifier (UPUNI) for the EREI;
    storing the collected entity information in a database record in a database, wherein the database record storing the collected entity information is keyed by the generated UPUNI, wherein the storage of the entity information occurs before effecting registration of the UPUNI in one phase of a multi-phase registration commitment;
    generating validation information for the EREI;
    transmitting validation information to an access device of the EREI, if an UPUNI registration agency (UPUNI-REG) generated the validation information;
    deleting the validation information from the UPUNI-REG upon transmitting the validation information, if the UPUNI-REG generated the validation information;
    transmitting validation information to the UPUNI-REG, if another device generated the validation information;
    storing the generated validation information in a database record in a database, wherein the database record storing the generated validation information is keyed by the generated UPUNI, wherein the storage of the validation information occurs before effecting registration of the UPUNI in one phase of a multi-phase registration commitment;
    registering a resolvable association between an UPUNI and reference to related information, wherein registration is effected in a database to associate and resolve UPUNIs and references to related information (UPUNI-RES), wherein the reference to related information is entered in a database record keyed by the generated UPUNI, wherein the registration of the UPUNI in the UPUNI-RES is a phase of a multi-phase registration commitment that occurs after effecting the storage of the related information, wherein in the entity information is related information, and wherein the validation information is related information.

2. A method of using at least one computer to effect access to information, comprising:
    effecting collection of information regarding an entity (entity information), wherein the entity is represented by the entity information (EREI);
    effecting generation of an unique, persistently accessible, and universal name identifier (UPUNI);
    effecting storage of the collected entity information in a database record in a database;
    effecting generation of validation information;
    effecting transmission of validation information to access devices of the EREI, if an UPUNI registration agency (UPUNI-REG) generated the validation information;
    effecting transmission of validation information to the UPUNI-REG, if the another device generated the validation information;
    effecting storage of the generated validation information in a database record in a database;
    effecting registration of a resolvable association between an UPUNI and reference to related information, wherein registration is effected in a database to associate and resolve UPUNIs and references to related information (UPUNI-RES), wherein in the entity information is related information, and wherein the validation information is related information.

3. The method of claim 1, wherein entity information value fields may include:
    name of entity, address, telephone number, access device, reference to access device, social security number, credit information, medical information, company account information, custom fields, custom records.

4. The method of claim 1, wherein the entity information value fields include UPUNI information.

5. The method of claim 1, wherein the entity information is an UPUNI that resolves to other validation information.

6. The method of claim 1, wherein the UPUNI is generated for the EREI.

7. The method of claim 1, wherein the UPUNI is generated for the related information.

8. The method of claim 1, wherein the database record storing the collected entity information is keyed by the generated UPUNI.

9. The method of claim 1, wherein the database storing the collected entity information holds UPUNI and entity information (EI-UPUNI-DB).

10. The method of claim 1, wherein the database storing the collected entity information is a metadata database (MDDB).

11. The method of claim 1, wherein the storage of the entity information occurs before effecting registration of the UPUNI in one phase of a multi-phase registration commitment.

12. A method of using at least one computer to effect access to information, comprising:
    effecting determination of if information an entity desires to access (desired information) on the entity's access device (entity device) has an unique, persistently accessible, and universal name identifier (UPUNI) embedded within the desired information;

effecting determination of if the desired information is inaccessible; effecting determination of if there exists an UPUNI that represents the entity (E-UPUNI);

effecting the generation of the E-UPUNI, if the entity is un-represented by an UPUNI;

effecting the resolution of the entity device to the desired information's UPUNI (DI-UPUNI);

effecting the provision of entity verification information;

effecting verification of the entity's identity and access rights to the desired content with the provided entity verification information (entity verification);

effecting provision of access credentials, if the entity's identity and access rights to the desired content are verified.

13. The method of claim 12, further comprising:

effecting the access of the desired information, if the UPUNI is absent from the desired information.

14. The method of claim 12, wherein the desired information is inaccessible because the desired information is protected.

15. The method of claim 14, wherein the desired information is protected with encryption.

16. The method of claim 12, wherein the desired information is an UPUNI that resolves to other desired information.

17. The method of claim 12, wherein the entity device resolves to the DI-UPUNI, only if an E-UPUNI exists.

18. The method of claim 12, wherein the DI-UPUNI resolution directs the entity device to an access tracking system (ATS).

19. The method of claim 12, wherein the DI-UPUNI resolution directs the entity to a rights clearinghouse.

20. The method of claim 12, wherein the E-UPUNI is entity verification information.

* * * * *